(12) United States Patent
McGhie et al.

(10) Patent No.: US 8,376,224 B2
(45) Date of Patent: *Feb. 19, 2013

(54) SELF-SERVICE STATIONS FOR UTILIZING NON-NEGOTIABLE CREDITS EARNED FROM A GAME OF CHANCE

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 136 days.

This patent is subject to a terminal disclaimer.

(21) Appl. No.: 13/168,814

(22) Filed: Jun. 24, 2011

(65) Prior Publication Data

US 2011/0256924 A1  Oct. 20, 2011

Related U.S. Application Data

(63) Continuation-in-part of application No. 11/420,255, filed on May 25, 2006, now Pat. No. 7,703,673, and a continuation-in-part of application No. 12/720,743, filed on Mar. 10, 2010, now Pat. No. 8,123,127, and a continuation-in-part of application No. 12/759,506, filed on Apr. 13, 2010, now Pat. No. 8,162,209.

(60) Provisional application No. 61/358,650, filed on Jun. 25, 2010.

(51) Int. Cl.
 *G06K 5/00* (2006.01)
(52) U.S. Cl. ........ 235/380; 235/375; 235/379; 235/487; 463/25
(58) Field of Classification Search .................. 235/380, 235/375, 379, 487, 486; 705/14, 39; 463/25
See application file for complete search history.

(56) References Cited

U.S. PATENT DOCUMENTS

| | | | |
|---|---|---|---|
| 3,918,716 A | 11/1975 | Nonaka et al. |
| 4,087,660 A | 5/1978 | Sedley |
| 4,358,672 A | 11/1982 | Hyatt et al. |
| 4,473,825 A | 9/1984 | Walton |
| 4,518,098 A | 5/1985 | Fleischer |
| 4,546,241 A | 10/1985 | Walton |
| 4,582,324 A | 4/1986 | Koza et al. |

(Continued)

FOREIGN PATENT DOCUMENTS

| | | |
|---|---|---|
| AU | 6484498 | 11/1998 |
| AU | 2497399 | 11/1999 |

(Continued)

OTHER PUBLICATIONS

Notice of Allowance; U.S. Appl. No. 13/441,365; Mailing Date Jun. 16, 2012.

(Continued)

*Primary Examiner* — Edwyn Labaze
(74) *Attorney, Agent, or Firm* — Brian K. Buchheit; Scott M. Garrett; Patents on Demand, P.A.

(57) ABSTRACT

Entertainment credits from a game of chance can be identified. The entertainment credits can be associated with an entity with which a user has previously interacted. The previous interactions can earning the entertainment credits, which are non-negotiable credits. Responsive to a user request, a conversion agency can convert a quantity of the entertainment credits to a quantity of negotiable funds, wherein the conversion agency is not directly associated with the entity. The user can be permitted to access the quantity of negotiable funds within a vendor kiosk physically proximate and distinctly independent of the entity, wherein the quantity of negotiable funds are able to be applied to user specified purchases within the kiosk, wherein the vendor does not honor the non-negotiable credits.

20 Claims, 6 Drawing Sheets

U.S. PATENT DOCUMENTS

| | | | |
|---|---|---|---|
| 4,607,155 A | 8/1986 | Nao et al. | |
| 4,609,812 A | 9/1986 | Drexler | |
| 4,621,814 A | 11/1986 | Stepan et al. | |
| 4,634,848 A | 1/1987 | Shinohara et al. | |
| 4,689,742 A | 8/1987 | Troy et al. | |
| 4,695,053 A | 9/1987 | Vazquez | |
| 4,760,527 A | 7/1988 | Sidley | |
| 4,764,666 A | 8/1988 | Bergeron | |
| 4,882,473 A | 11/1989 | Bergeron | |
| 4,910,672 A | 3/1990 | Off et al. | |
| 4,941,090 A | 7/1990 | McCarthy | |
| 4,942,090 A | 7/1990 | Morin | |
| 4,968,873 A | 11/1990 | Dethloff | |
| 5,025,372 A | 6/1991 | Burton et al. | |
| 5,038,022 A | 8/1991 | Lucero | |
| 5,056,019 A | 10/1991 | Schultz et al. | |
| 5,080,364 A | 1/1992 | Seidman | |
| 5,105,184 A | 4/1992 | Pirani et al. | |
| 5,117,355 A | 5/1992 | McCarthy | |
| 5,128,752 A | 7/1992 | Von Kohorn | |
| 5,135,224 A | 8/1992 | Yamamoto | |
| 5,173,851 A | 12/1992 | Off et al. | |
| 5,179,517 A | 1/1993 | Sarbin et al. | |
| 5,200,889 A | 4/1993 | Mori | |
| 5,201,010 A | 4/1993 | Deaton et al. | |
| 5,202,826 A | 4/1993 | McCarthy | |
| 5,233,514 A | 8/1993 | Ayyoubi et al. | |
| 5,237,620 A | 8/1993 | Deaton et al. | |
| 5,256,863 A | 10/1993 | Ferguson et al. | |
| 5,265,874 A | 11/1993 | Dickinson | |
| 5,276,312 A | 1/1994 | McCarthy | |
| 5,287,268 A | 2/1994 | McCarthy | |
| 5,287,269 A | 2/1994 | Dorrough et al. | |
| 5,290,033 A | 3/1994 | Bittner et al. | |
| 5,305,196 A | 4/1994 | Deaton et al. | |
| 5,327,508 A | 7/1994 | Deaton et al. | |
| 5,332,076 A | 7/1994 | Ziegert | |
| 5,344,144 A | 9/1994 | Canon | |
| 5,353,218 A | 10/1994 | De Lapa et al. | |
| 5,371,345 A | 12/1994 | LeStrange et al. | |
| 5,373,440 A | 12/1994 | Cohen et al. | |
| 5,382,779 A | 1/1995 | Gupta | |
| 5,388,165 A | 2/1995 | Deaton et al. | |
| 5,393,061 A | 2/1995 | Manship et al. | |
| 5,397,125 A | 3/1995 | Adams | |
| 5,398,932 A | 3/1995 | Eberhardt et al. | |
| 5,402,872 A | 4/1995 | Clurman | |
| 5,424,524 A | 6/1995 | Ruppert et al. | |
| 5,429,361 A | 7/1995 | Raven et al. | |
| 5,430,644 A | 7/1995 | Deaton et al. | |
| 5,434,394 A | 7/1995 | Roach et al. | |
| 5,448,471 A | 9/1995 | Deaton et al. | |
| 5,457,306 A | 10/1995 | Lucero | |
| 5,467,269 A | 11/1995 | Flaten | |
| 5,470,079 A | 11/1995 | LeStrange et al. | |
| 5,471,669 A | 11/1995 | Lidman | |
| 5,477,038 A | 12/1995 | Levine et al. | |
| 5,483,444 A | 1/1996 | Heintzeman et al. | |
| 5,491,326 A | 2/1996 | Marceau et al. | |
| 5,502,636 A | 3/1996 | Clarke | |
| 5,511,781 A | 4/1996 | Wood et al. | |
| 5,513,102 A | 4/1996 | Auriemma | |
| 5,535,407 A | 7/1996 | Yanagawa et al. | |
| 5,537,314 A | 7/1996 | Kanter | |
| 5,551,692 A | 9/1996 | Pettit et al. | |
| 5,559,312 A | 9/1996 | Lucero | |
| 5,559,313 A | 9/1996 | Claus et al. | |
| 5,564,546 A | 10/1996 | Molbak et al. | |
| 5,564,700 A | 10/1996 | Celona | |
| 5,580,309 A | 12/1996 | Piechowiak | |
| 5,586,936 A | 12/1996 | Bennett et al. | |
| 5,592,560 A | 1/1997 | Deaton et al. | |
| 5,609,337 A | 3/1997 | Clapper, Jr. | |
| 5,612,868 A | 3/1997 | Off et al. | |
| 5,613,912 A | 3/1997 | Slater | |
| 5,621,812 A | 4/1997 | Deaton et al. | |
| 5,635,696 A | 6/1997 | Dabrowski | |
| 5,638,457 A | 6/1997 | Deaton et al. | |
| 5,642,485 A | 6/1997 | Deaton et al. | |
| 5,643,088 A | 7/1997 | Vaughn et al. | |
| 5,644,723 A | 7/1997 | Deaton et al. | |
| 5,649,114 A | 7/1997 | Deaton et al. | |
| 5,649,115 A | 7/1997 | Schrader et al. | |
| 5,655,961 A | 8/1997 | Acres et al. | |
| 5,659,469 A | 8/1997 | Deaton et al. | |
| 5,672,109 A | 9/1997 | Natanian | |
| 5,673,322 A | 9/1997 | Pepe et al. | |
| 5,674,123 A | 10/1997 | Roberson, Jr. et al. | |
| 5,675,662 A | 10/1997 | Deaton et al. | |
| 5,677,952 A | 10/1997 | Blakeley, III et al. | |
| 5,687,322 A | 11/1997 | Deaton et al. | |
| 5,689,100 A | 11/1997 | Carrithers | |
| 5,697,611 A | 12/1997 | Kelly et al. | |
| 5,708,782 A | 1/1998 | Larson et al. | |
| 5,710,886 A | 1/1998 | Christensen et al. | |
| 5,715,399 A | 2/1998 | Bezos | |
| 5,725,428 A | 3/1998 | Achmuller | |
| 5,729,693 A | 3/1998 | Holda-Fleck | |
| 5,734,838 A | 3/1998 | Robinson et al. | |
| 5,741,183 A | 4/1998 | Acres | |
| 5,742,845 A | 4/1998 | Wagner | |
| 5,749,075 A | 5/1998 | Toader et al. | |
| 5,754,655 A | 5/1998 | Hughes | |
| 5,761,647 A | 6/1998 | Boushy | |
| 5,761,648 A | 6/1998 | Golden et al. | |
| 5,765,141 A | 6/1998 | Spector | |
| 5,766,075 A | 6/1998 | Cook et al. | |
| 5,769,716 A | 6/1998 | Saffari et al. | |
| 5,770,533 A | 6/1998 | Franchi | |
| 5,774,868 A | 6/1998 | Cragun et al. | |
| 5,774,869 A | 6/1998 | Toader | |
| 5,774,870 A | 6/1998 | Storey | |
| 5,779,549 A | 7/1998 | Walker et al. | |
| 5,794,230 A | 8/1998 | Horadan et al. | |
| 5,802,275 A | 9/1998 | Blonder | |
| 5,806,043 A | 9/1998 | Toader | |
| 5,806,044 A | 9/1998 | Powell | |
| 5,806,045 A | 9/1998 | Biorge et al. | |
| 5,809,482 A | 9/1998 | Strisower | |
| 5,814,796 A | 9/1998 | Benson et al. | |
| 5,816,918 A | 10/1998 | Kelly et al. | |
| 5,820,460 A | 10/1998 | Fulton | |
| 5,822,230 A | 10/1998 | Kikinis et al. | |
| 5,823,874 A | 10/1998 | Adams | |
| 5,832,457 A | 11/1998 | O'Brien et al. | |
| 5,832,458 A | 11/1998 | Jones | |
| 5,833,536 A | 11/1998 | Davids et al. | |
| 5,834,748 A | 11/1998 | Litman | |
| 5,836,817 A | 11/1998 | Acres | |
| 5,839,117 A | 11/1998 | Cameron et al. | |
| 5,844,230 A | 12/1998 | Lalonde | |
| 5,845,259 A | 12/1998 | West et al. | |
| 5,848,399 A | 12/1998 | Burke | |
| 5,851,148 A | 12/1998 | Brune et al. | |
| 5,855,007 A | 12/1998 | Jovicic et al. | |
| D404,436 S | 1/1999 | McGahn et al. | |
| 5,857,175 A | 1/1999 | Day et al. | |
| 5,864,822 A | 1/1999 | Baker, III | |
| RE36,116 E | 2/1999 | McCarthy et al. | |
| 5,870,722 A | 2/1999 | Albert et al. | |
| 5,876,284 A | 3/1999 | Acres et al. | |
| 5,882,261 A | 3/1999 | Adams | |
| 5,882,262 A | 3/1999 | Ballhorn | |
| 5,884,277 A | 3/1999 | Khosla | |
| 5,892,827 A | 4/1999 | Beach et al. | |
| 5,892,900 A | 4/1999 | Ginter et al. | |
| 5,892,905 A | 4/1999 | Brandt et al. | |
| 5,898,838 A | 4/1999 | Wagner | |
| 5,902,184 A | 5/1999 | Bennett | |
| 5,902,983 A | 5/1999 | Crevelt et al. | |
| 5,903,874 A | 5/1999 | Leonard et al. | |
| 5,903,880 A | 5/1999 | Biffar | |
| 5,905,173 A | 5/1999 | Kragten et al. | |
| 5,905,246 A | 5/1999 | Fajkowski | |
| 5,905,908 A | 5/1999 | Wagner | |
| 5,907,830 A | 5/1999 | Engel et al. | |
| 5,907,831 A | 5/1999 | Lotvin et al. | |

| | | | | | | |
|---|---|---|---|---|---|---|
| 5,909,023 A | 6/1999 | Ono et al. | | 6,032,136 A | 2/2000 | Brake, Jr. et al. |
| 5,909,486 A | 6/1999 | Walker et al. | | 6,032,955 A | 3/2000 | Luciano et al. |
| 5,911,418 A | 6/1999 | Adams | | 6,035,280 A | 3/2000 | Christensen |
| 5,913,210 A | 6/1999 | Call | | 6,035,281 A | 3/2000 | Crosskey et al. |
| 5,915,007 A | 6/1999 | Klapka | | 6,036,601 A | 3/2000 | Heckel |
| 5,915,019 A | 6/1999 | Ginter et al. | | 6,038,321 A | 3/2000 | Torigai et al. |
| 5,915,243 A | 6/1999 | Smolen | | 6,039,244 A | 3/2000 | Finsterwald |
| 5,915,244 A | 6/1999 | Jack et al. | | 6,039,648 A | 3/2000 | Guinn |
| 5,918,211 A | 6/1999 | Sloane | | 6,041,308 A | 3/2000 | Walker et al. |
| 5,918,213 A | 6/1999 | Bernard et al. | | 6,041,309 A | 3/2000 | Laor |
| 5,918,214 A | 6/1999 | Perkowski | | 6,044,360 A | 3/2000 | Picciallo |
| 5,919,091 A | 7/1999 | Bell et al. | | 6,047,269 A | 4/2000 | Biffar |
| 5,920,847 A | 7/1999 | Kolling et al. | | 6,048,269 A | 4/2000 | Burns |
| 5,923,016 A | 7/1999 | Fredregill et al. | | 6,049,778 A | 4/2000 | Walker et al. |
| 5,933,811 A | 8/1999 | Angles et al. | | 6,049,779 A | 4/2000 | Berkson |
| 5,935,000 A | 8/1999 | Sanchez, III | | 6,055,573 A | 4/2000 | Gardenswartz et al. |
| 5,937,391 A | 8/1999 | Ikeda et al. | | 6,058,371 A | 5/2000 | Djian |
| 5,937,394 A | 8/1999 | Wong et al. | | 6,058,482 A | 5/2000 | Liu |
| 5,938,727 A | 8/1999 | Ikeda | | 6,061,660 A | 5/2000 | Eggleston |
| 5,940,506 A | 8/1999 | Chang et al. | | 6,062,980 A | 5/2000 | Luciano |
| 5,941,771 A | 8/1999 | Haste, III | | 6,064,979 A | 5/2000 | Perkowski |
| 5,941,772 A | 8/1999 | Paige | | 6,064,987 A | 5/2000 | Walker |
| 5,943,241 A | 8/1999 | Nichols et al. | | 6,065,120 A | 5/2000 | Laursen et al. |
| 5,946,664 A | 8/1999 | Ebisawa | | 6,068,533 A | 5/2000 | Glickman |
| 5,947,820 A | 9/1999 | Morro et al. | | 6,068,553 A | 5/2000 | Parker |
| 5,949,042 A | 9/1999 | Dietz, II et al. | | 6,072,468 A | 6/2000 | Hocker et al. |
| 5,951,397 A | 9/1999 | Dickinson | | 6,073,840 A | 6/2000 | Marion |
| 5,952,638 A | 9/1999 | Demers et al. | | 6,075,863 A | 6/2000 | Krishnan et al. |
| 5,953,005 A | 9/1999 | Liu | | 6,076,101 A | 6/2000 | Kamakura et al. |
| 5,956,038 A | 9/1999 | Rekimoto | | 6,078,898 A | 6/2000 | Davis et al. |
| 5,956,695 A | 9/1999 | Carrithers et al. | | 6,081,900 A | 6/2000 | Subramaniam et al. |
| 5,956,700 A | 9/1999 | Landry | | 6,088,730 A | 7/2000 | Kato et al. |
| 5,959,277 A | 9/1999 | Lucero | | 6,089,982 A | 7/2000 | Holch |
| 5,967,896 A | 10/1999 | Jorasch et al. | | 6,092,069 A | 7/2000 | Johnson et al. |
| 5,970,469 A | 10/1999 | Scroggie et al. | | 6,092,201 A | 7/2000 | Turnbull et al. |
| 5,970,470 A | 10/1999 | Walker | | 6,094,486 A | 7/2000 | Marchant |
| 5,971,277 A | 10/1999 | Cragun et al. | | 6,098,837 A | 8/2000 | Izawa |
| 5,974,135 A | 10/1999 | Breneman et al. | | 6,101,483 A | 8/2000 | Petrovich et al. |
| 5,974,398 A | 10/1999 | Hanson et al. | | 6,101,484 A | 8/2000 | Halbert et al. |
| 5,978,777 A | 11/1999 | Garnier | | 6,101,485 A | 8/2000 | Fortenberry et al. |
| 5,979,757 A | 11/1999 | Tracy et al. | | 6,105,001 A | 8/2000 | Masi et al. |
| 5,980,385 A | 11/1999 | Clapper | | 6,105,865 A | 8/2000 | Hardesty |
| 5,982,520 A | 11/1999 | Weiser et al. | | 6,110,041 A | 8/2000 | Walker et al. |
| 5,983,196 A | 11/1999 | Wendkos | | 6,110,042 A | 8/2000 | Walker et al. |
| 5,983,205 A | 11/1999 | Brams et al. | | 6,113,098 A | 9/2000 | Adams |
| 5,984,191 A | 11/1999 | Chapin, Jr. | | 6,113,495 A | 9/2000 | Walker et al. |
| 5,988,500 A | 11/1999 | Litman | | 6,115,737 A | 9/2000 | Ely et al. |
| 5,991,376 A | 11/1999 | Hennessy et al. | | 6,119,229 A | 9/2000 | Martinez |
| 5,991,736 A | 11/1999 | Ferguson et al. | | 6,119,230 A | 9/2000 | Carter |
| 5,992,738 A | 11/1999 | Matsumoto et al. | | 6,124,947 A | 9/2000 | Sea |
| 5,992,752 A | 11/1999 | Wilz, Sr. et al. | | 6,128,599 A | 10/2000 | Walker et al. |
| 5,993,316 A | 11/1999 | Coyle | | 6,128,603 A | 10/2000 | Dent et al. |
| 5,995,942 A | 11/1999 | Smith et al. | | 6,129,274 A | 10/2000 | Suzuki |
| 5,999,624 A | 12/1999 | Hopkins | | 6,131,810 A | 10/2000 | Weiss et al. |
| 5,999,914 A | 12/1999 | Blinn et al. | | 6,134,318 A | 10/2000 | O'Neil |
| 6,000,608 A | 12/1999 | Dorf | | 6,134,548 A | 10/2000 | Gottsman et al. |
| 6,002,771 A | 12/1999 | Nielsen | | 6,138,911 A | 10/2000 | Fredregill et al. |
| 6,003,013 A | 12/1999 | Boushy | | 6,139,431 A | 10/2000 | Walker et al. |
| 6,007,426 A | 12/1999 | Kelly et al. | | 6,141,161 A | 10/2000 | Sato et al. |
| 6,009,411 A | 12/1999 | Kepecs | | 6,141,653 A | 10/2000 | Conklin |
| 6,009,412 A | 12/1999 | Storey | | 6,141,684 A | 10/2000 | McDonald et al. |
| 6,009,458 A | 12/1999 | Hawkins | | 6,145,739 A | 11/2000 | Bertina et al. |
| 6,012,039 A | 1/2000 | Hoffman et al. | | 6,148,405 A | 11/2000 | Liao et al. |
| 6,012,051 A | 1/2000 | Sammon, Jr. et al. | | 6,154,214 A | 11/2000 | Uyehara et al. |
| 6,012,636 A | 1/2000 | Smith | | 6,161,096 A | 12/2000 | Bell |
| 6,014,594 A | 1/2000 | Heidel | | 6,162,122 A | 12/2000 | Acres |
| 6,014,634 A | 1/2000 | Scroggie et al. | | 6,164,533 A | 12/2000 | Barton |
| 6,014,635 A | 1/2000 | Harris et al. | | 6,165,071 A | 12/2000 | Weiss |
| 6,015,344 A | 1/2000 | Kelly | | 6,168,522 B1 | 1/2001 | Walker |
| 6,016,476 A | 1/2000 | Maes et al. | | 6,173,267 B1 | 1/2001 | Cairns |
| 6,018,695 A | 1/2000 | Ahrens et al. | | 6,178,407 B1 | 1/2001 | Lotvin et al. |
| 6,018,718 A | 1/2000 | Walker et al. | | 6,178,408 B1 | 1/2001 | Copple |
| 6,018,724 A | 1/2000 | Arent | | 6,182,894 B1 | 2/2001 | Hackett et al. |
| 6,021,399 A | 2/2000 | Demers et al. | | 6,183,362 B1 | 2/2001 | Boushy |
| 6,024,640 A | 2/2000 | Walker et al. | | 6,183,366 B1 | 2/2001 | Goldberg et al. |
| 6,026,370 A | 2/2000 | Jermyn | | 6,185,541 B1 | 2/2001 | Scroggie et al. |
| 6,026,375 A | 2/2000 | Hall et al. | | 6,186,893 B1 | 2/2001 | Walker et al. |
| 6,026,377 A | 2/2000 | Burke | | 6,186,894 B1 | 2/2001 | Mayeroff |
| 6,032,133 A | 2/2000 | Hilt et al. | | 6,189,103 B1 | 2/2001 | Nevarez et al. |

| | | |
|---|---|---|
| 6,193,608 B1 | 2/2001 | Walker et al. |
| 6,195,677 B1 | 2/2001 | Utsumi |
| 6,196,458 B1 | 3/2001 | Walker et al. |
| 6,199,099 B1 | 3/2001 | Gershman et al. |
| 6,216,129 B1 | 4/2001 | Eldering |
| 6,222,914 B1 | 4/2001 | McMullin |
| 6,224,483 B1 | 5/2001 | Mayeroff |
| 6,227,972 B1 | 5/2001 | Walker et al. |
| 6,229,533 B1 | 5/2001 | Farmer |
| 6,231,442 B1 | 5/2001 | Mayeroff |
| 6,234,896 B1 | 5/2001 | Walker et al. |
| 6,236,978 B1 | 5/2001 | Tuzhilin |
| 6,243,688 B1 | 6/2001 | Kalina |
| 6,244,958 B1 | 6/2001 | Acres |
| 6,249,773 B1 | 6/2001 | Allard et al. |
| 6,267,671 B1 | 7/2001 | Hogan |
| 6,273,820 B1 | 8/2001 | Haste, III |
| 6,280,326 B1 | 8/2001 | Saunders |
| 6,280,328 B1 | 8/2001 | Holch |
| 6,289,261 B1 | 9/2001 | Heidel |
| 6,289,322 B1 | 9/2001 | Kitchen et al. |
| 6,292,786 B1 | 9/2001 | Deaton et al. |
| 6,293,865 B1 | 9/2001 | Kelly et al. |
| 6,293,866 B1 | 9/2001 | Walker et al. |
| 6,293,867 B1 | 9/2001 | Heidel |
| 6,298,335 B1 | 10/2001 | Bernstein |
| 6,302,793 B1 | 10/2001 | Fertitta |
| 6,306,035 B1 | 10/2001 | Kelly |
| 6,311,976 B1 | 11/2001 | Yoseloff |
| 6,312,333 B1 | 11/2001 | Acres |
| 6,315,665 B1 | 11/2001 | Faith |
| 6,319,125 B1 | 11/2001 | Acres |
| 6,327,573 B1 | 12/2001 | Walker et al. |
| 6,332,099 B1 | 12/2001 | Heidel |
| 6,332,157 B1 | 12/2001 | Mighdoli et al. |
| 6,341,353 B1 | 1/2002 | Herman |
| 6,345,261 B1 | 2/2002 | Feidelson et al. |
| 6,352,175 B2 | 3/2002 | Izawa |
| 6,358,149 B1 | 3/2002 | Schneider et al. |
| 6,363,362 B1 | 3/2002 | Burfield et al. |
| 6,379,247 B1 | 4/2002 | Walker et al. |
| 6,394,907 B1 | 5/2002 | Rowe |
| 6,402,029 B1 | 6/2002 | Gangi |
| 6,408,284 B1 | 6/2002 | Hilt et al. |
| 6,431,983 B2 | 8/2002 | Acres |
| 6,438,527 B1 | 8/2002 | Powar |
| 6,452,498 B2 | 9/2002 | Stewart |
| 6,476,830 B1 | 11/2002 | Farmer |
| 6,484,940 B1 | 11/2002 | Dilday et al. |
| 6,486,768 B1 | 11/2002 | French et al. |
| 6,491,584 B2 | 12/2002 | Graham |
| 6,505,772 B1 | 1/2003 | Mollett et al. |
| 6,510,998 B1 | 1/2003 | Stanford et al. |
| 6,511,377 B1 | 1/2003 | Weiss |
| 6,522,889 B1 | 2/2003 | Aarnio |
| 6,533,664 B1 | 3/2003 | Crumby |
| 6,547,131 B1 | 4/2003 | Foodman |
| 6,549,912 B1 | 4/2003 | Chen |
| 6,554,705 B1 | 4/2003 | Cumbers |
| 6,572,471 B1 | 6/2003 | Bennett |
| 6,575,832 B1 | 6/2003 | Manfredi et al. |
| 6,578,015 B1 | 6/2003 | Haseltine et al. |
| 6,579,179 B2 | 6/2003 | Poole |
| 6,601,040 B1 | 7/2003 | Kolls |
| 6,607,441 B1 | 8/2003 | Acres |
| 6,609,150 B2 | 8/2003 | Lee et al. |
| 6,609,969 B1 | 8/2003 | Luciano |
| 6,609,970 B1 | 8/2003 | Luciano |
| 6,609,978 B1 | 8/2003 | Paulsen |
| 6,623,357 B2 | 9/2003 | Chowdhury |
| 6,631,358 B1 | 10/2003 | Ogilvie |
| 6,631,849 B2 | 10/2003 | Blossom |
| 6,645,077 B2 | 11/2003 | Rowe |
| 6,648,755 B1 | 11/2003 | Luciano, Jr. |
| 6,656,050 B2 | 12/2003 | Busch |
| 6,685,559 B2 | 2/2004 | Luciano |
| 6,687,679 B1 | 2/2004 | Van Luchene et al. |
| 6,721,743 B1 | 4/2004 | Sakakibara |
| 6,748,365 B1 | 6/2004 | Quinlan et al. |
| 6,800,029 B2 | 10/2004 | Rowe |
| 6,813,609 B2 | 11/2004 | Wilson |
| 6,820,061 B2 | 11/2004 | Postrel |
| 6,826,594 B1 | 11/2004 | Pettersen |
| 6,829,586 B2 | 12/2004 | Postrel |
| 6,842,739 B2 | 1/2005 | Postrel |
| 6,843,720 B2 | 1/2005 | Luciano |
| 6,846,238 B2 | 1/2005 | Wells |
| 6,852,031 B1 | 2/2005 | Rowe |
| 6,856,976 B2 | 2/2005 | Bible et al. |
| 6,866,586 B2 | 3/2005 | Oberberger |
| 6,898,570 B1 | 5/2005 | Tedesco et al. |
| 6,915,271 B1 | 7/2005 | Meyer et al. |
| 6,920,611 B1 | 7/2005 | Spaeth et al. |
| 6,929,550 B2 | 8/2005 | Hisada |
| 6,931,538 B1 | 8/2005 | Sawaguchi |
| 6,947,898 B2 | 9/2005 | Postrel |
| 6,951,302 B2 | 10/2005 | Potts |
| 6,985,876 B1 | 1/2006 | Lee |
| 6,997,807 B2 | 2/2006 | Weiss |
| 7,003,496 B2 | 2/2006 | Ishii |
| 7,025,674 B2 | 4/2006 | Adams |
| 7,043,752 B2 | 5/2006 | Royer et al. |
| 7,072,864 B2 | 7/2006 | Brake, Jr. et al. |
| 7,096,190 B2 | 8/2006 | Postrel |
| 7,127,414 B1 | 10/2006 | Awadallah et al. |
| 7,128,652 B1 | 10/2006 | Lavoie |
| 7,130,828 B2 | 10/2006 | Phillips et al. |
| 7,134,959 B2 | 11/2006 | Penrice |
| 7,137,883 B1 | 11/2006 | Falciglia |
| 7,146,342 B1 | 12/2006 | Angelin |
| 7,168,089 B2 | 1/2007 | Nguyen |
| 7,174,315 B2 | 2/2007 | Phillips et al. |
| 7,187,947 B1 | 3/2007 | White et al. |
| 7,200,571 B1 | 4/2007 | Jenniges et al. |
| 7,249,139 B2 | 7/2007 | Chuah |
| 7,249,197 B1 | 7/2007 | Roestenburg et al. |
| 7,289,970 B1 | 10/2007 | Siegel |
| 7,290,061 B2 | 10/2007 | Lentini et al. |
| 7,291,064 B2 | 11/2007 | Yamada |
| 7,321,901 B1 | 1/2008 | Blinn et al. |
| 7,349,867 B2 | 3/2008 | Rollins et al. |
| 7,360,693 B1 | 4/2008 | Sullivan |
| 7,387,571 B2 | 6/2008 | Walker |
| 7,390,264 B2 | 6/2008 | Walker |
| 7,398,226 B2 | 7/2008 | Haines et al. |
| 7,455,586 B2 | 11/2008 | Nguyen |
| 7,613,629 B2 | 11/2009 | Antonucci et al. |
| 7,641,547 B2 | 1/2010 | Walker et al. |
| 7,680,688 B2 | 3/2010 | Hessburg |
| 7,703,673 B2 | 4/2010 | Buchheit et al. |
| 7,747,463 B1 | 6/2010 | Phillips et al. |
| 7,765,124 B2 | 7/2010 | Postrel |
| 7,827,056 B2 | 11/2010 | Walker et al. |
| 7,827,057 B1 | 11/2010 | Walker et al. |
| 7,828,206 B2 | 11/2010 | Hessburg et al. |
| 7,856,376 B2 | 12/2010 | Storey |
| 8,046,256 B2 | 10/2011 | Chien et al. |
| 8,062,116 B2 | 11/2011 | Lutnick et al. |
| 8,100,758 B2 | 1/2012 | Walker et al. |
| 8,123,127 B2 | 2/2012 | McGhie et al. |
| 8,162,209 B2 | 4/2012 | Buchheit et al. |
| 8,181,863 B1 | 5/2012 | McGhie et al. |
| 8,181,864 B1 | 5/2012 | McGhie et al. |
| 8,186,583 B1 | 5/2012 | McGhie et al. |
| 8,201,734 B1 | 6/2012 | McGhie et al. |
| 8,234,164 B2 | 7/2012 | Walker et al. |
| 8,245,925 B1 | 8/2012 | McGhie et al. |
| 8,267,315 B1 | 9/2012 | McGhie et al. |
| 8,297,502 B1 | 10/2012 | McGhie et al. |
| 8,313,023 B1 | 11/2012 | McGhie et al. |
| 2001/0032137 A1 | 10/2001 | Bennett et al. |
| 2001/0032182 A1 | 10/2001 | Kumar et al. |
| 2001/0032183 A1 | 10/2001 | Landry |
| 2001/0034259 A1 | 10/2001 | Luciano et al. |
| 2001/0034649 A1 | 10/2001 | Acres |
| 2001/0034653 A1 | 10/2001 | Yamamoto |
| 2001/0034720 A1 | 10/2001 | Armes |
| 2001/0037295 A1 | 11/2001 | Olsen |

| | | |
|---|---|---|
| 2001/0041610 A1 | 11/2001 | Luciano et al. |
| 2001/0044337 A1 | 11/2001 | Rowe |
| 2001/0046891 A1 | 11/2001 | Acres |
| 2001/0047342 A1 | 11/2001 | Cuervo |
| 2001/0054003 A1 | 12/2001 | Chien |
| 2002/0002075 A1 | 1/2002 | Rowe |
| 2002/0002532 A1 | 1/2002 | Tso |
| 2002/0002538 A1 | 1/2002 | Ling |
| 2002/0010025 A1 | 1/2002 | Kelly et al. |
| 2002/0013728 A1 | 1/2002 | Wilkman |
| 2002/0013767 A1 | 1/2002 | Katz |
| 2002/0016734 A1 | 2/2002 | McGill et al. |
| 2002/0020965 A1 | 2/2002 | Potter |
| 2002/0026348 A1 | 2/2002 | Fowler et al. |
| 2002/0039923 A1 | 4/2002 | Cannon |
| 2002/0045476 A1 | 4/2002 | Poole |
| 2002/0046110 A1 | 4/2002 | Gallagher |
| 2002/0049631 A1 | 4/2002 | Williams |
| 2002/0052940 A1 | 5/2002 | Myers et al. |
| 2002/0055874 A1 | 5/2002 | Cohen |
| 2002/0056044 A1 | 5/2002 | Andersson |
| 2002/0062253 A1 | 5/2002 | Dosh et al. |
| 2002/0065126 A1 | 5/2002 | Miller et al. |
| 2002/0068624 A1 | 6/2002 | Ellis |
| 2002/0069109 A1 | 6/2002 | Wendkos |
| 2002/0069150 A1 | 6/2002 | Ni |
| 2002/0072412 A1 | 6/2002 | Young |
| 2002/0075844 A1 | 6/2002 | Hagen |
| 2002/0077173 A1 | 6/2002 | Luciano et al. |
| 2002/0077890 A1 | 6/2002 | LaPointe et al. |
| 2002/0077978 A1 | 6/2002 | O'Leary et al. |
| 2002/0082918 A1 | 6/2002 | Warwick |
| 2002/0082920 A1 | 6/2002 | Austin |
| 2002/0082990 A1 | 6/2002 | Jones |
| 2002/0086733 A1 | 7/2002 | Wang |
| 2002/0087468 A1 | 7/2002 | Ganesan et al. |
| 2002/0091593 A1 | 7/2002 | Fowler |
| 2002/0095365 A1 | 7/2002 | Slavin et al. |
| 2002/0107072 A1 | 8/2002 | Giobbi |
| 2002/0107733 A1 | 8/2002 | Liu et al. |
| 2002/0111210 A1 | 8/2002 | Luciano, Jr. |
| 2002/0111907 A1 | 8/2002 | Ling |
| 2002/0111919 A1 | 8/2002 | Weller et al. |
| 2002/0116257 A1 | 8/2002 | Helbig |
| 2002/0120513 A1 | 8/2002 | Webb et al. |
| 2002/0123949 A1 | 9/2002 | VanLeeuwen |
| 2002/0143614 A1 | 10/2002 | MacLean et al. |
| 2002/0146018 A1 | 10/2002 | Kailamaki et al. |
| 2002/0147047 A1 | 10/2002 | Letovsky |
| 2002/0152116 A1 | 10/2002 | Yan |
| 2002/0160838 A1 | 10/2002 | Kim |
| 2002/0161630 A1 | 10/2002 | Kern et al. |
| 2002/0169021 A1 | 11/2002 | Urie |
| 2002/0169660 A1 | 11/2002 | Taylor et al. |
| 2002/0177479 A1 | 11/2002 | Walker |
| 2002/0194069 A1 | 12/2002 | Thakur et al. |
| 2002/0198043 A1 | 12/2002 | Chowdhury |
| 2003/0003996 A1 | 1/2003 | Nguyen |
| 2003/0004802 A1 | 1/2003 | Callegari |
| 2003/0004808 A1 | 1/2003 | Elhaoussine et al. |
| 2003/0008707 A1 | 1/2003 | Walker et al. |
| 2003/0009379 A1 | 1/2003 | Narasimhan et al. |
| 2003/0013438 A1 | 1/2003 | Darby |
| 2003/0018523 A1 | 1/2003 | Rappaport et al. |
| 2003/0033534 A1 | 2/2003 | Rand |
| 2003/0036425 A1 | 2/2003 | Kaminkow et al. |
| 2003/0040964 A1 | 2/2003 | Lacek |
| 2003/0045353 A1 | 3/2003 | Paulsen |
| 2003/0050831 A1 | 3/2003 | Klayh |
| 2003/0055722 A1 | 3/2003 | Perreault et al. |
| 2003/0055780 A1 | 3/2003 | Hansen et al. |
| 2003/0060264 A1 | 3/2003 | Chilton |
| 2003/0061097 A1 | 3/2003 | Walker |
| 2003/0062242 A1 | 4/2003 | Hallowell et al. |
| 2003/0069787 A1 | 4/2003 | Tendon et al. |
| 2003/0069842 A1 | 4/2003 | Kight et al. |
| 2003/0074311 A1 | 4/2003 | Saylors et al. |
| 2003/0078094 A1 | 4/2003 | Gatto |
| 2003/0083943 A1 | 5/2003 | Adams et al. |
| 2003/0087650 A1 | 5/2003 | Aarnio |
| 2003/0087692 A1 | 5/2003 | Weiss |
| 2003/0101131 A1 | 5/2003 | Warren et al. |
| 2003/0104862 A1 | 6/2003 | Acres |
| 2003/0104865 A1 | 6/2003 | Itkis |
| 2003/0106769 A1 | 6/2003 | Weiss |
| 2003/0115456 A1 | 6/2003 | Kapoor |
| 2003/0130948 A1 | 7/2003 | Algiene et al. |
| 2003/0148807 A1 | 8/2003 | Acres |
| 2003/0163425 A1 | 8/2003 | Cannon, Jr. |
| 2003/0182218 A1 | 9/2003 | Blagg |
| 2003/0186747 A1 | 10/2003 | Nguyen |
| 2003/0187762 A1 | 10/2003 | Coyle |
| 2003/0200142 A1 | 10/2003 | Hicks et al. |
| 2003/0200144 A1 | 10/2003 | Antonucci et al. |
| 2003/0208445 A1 | 11/2003 | Compiano |
| 2003/0211883 A1 | 11/2003 | Potts |
| 2003/0216960 A1 | 11/2003 | Postrel |
| 2003/0216967 A1 | 11/2003 | Williams |
| 2003/0228902 A1 | 12/2003 | Walker |
| 2003/0229584 A1 | 12/2003 | Brown |
| 2003/0236749 A1 | 12/2003 | Shergalis |
| 2004/0002369 A1 | 1/2004 | Walker et al. |
| 2004/0006531 A1 | 1/2004 | Kwan |
| 2004/0015438 A1 | 1/2004 | Compiano et al. |
| 2004/0019522 A1 | 1/2004 | Bortolin |
| 2004/0019560 A1 | 1/2004 | Evans et al. |
| 2004/0035923 A1 | 2/2004 | Kahr |
| 2004/0039644 A1 | 2/2004 | Postrel |
| 2004/0039692 A1 | 2/2004 | Shields et al. |
| 2004/0043806 A1 | 3/2004 | Kirby |
| 2004/0048658 A1 | 3/2004 | Sanders |
| 2004/0049439 A1 | 3/2004 | Johnston et al. |
| 2004/0053693 A1 | 3/2004 | An |
| 2004/0068438 A1 | 4/2004 | Mitchell |
| 2004/0078273 A1 | 4/2004 | Loeb et al. |
| 2004/0097287 A1 | 5/2004 | Postrel |
| 2004/0098317 A1 | 5/2004 | Postrel |
| 2004/0107140 A1 | 6/2004 | Postrel |
| 2004/0111346 A1 | 6/2004 | Mcbeath |
| 2004/0111366 A1 | 6/2004 | Schneider |
| 2004/0128197 A1 | 7/2004 | Barn |
| 2004/0143500 A1 | 7/2004 | Lopez |
| 2004/0143501 A1 | 7/2004 | Lopez |
| 2004/0158492 A1 | 8/2004 | Lopez |
| 2004/0173673 A1 | 9/2004 | Potts |
| 2004/0215505 A1 | 10/2004 | Sullivan |
| 2004/0220854 A1 | 11/2004 | Postrel |
| 2004/0229671 A1 | 11/2004 | Stronach |
| 2004/0262381 A1 | 12/2004 | Mesaros |
| 2005/0015332 A1 | 1/2005 | Chen |
| 2005/0021399 A1 | 1/2005 | Postrel |
| 2005/0021400 A1 | 1/2005 | Postrel |
| 2005/0021401 A1 | 1/2005 | Postrel |
| 2005/0021457 A1 | 1/2005 | Johnson et al. |
| 2005/0043082 A1 | 2/2005 | Peterson |
| 2005/0060225 A1 | 3/2005 | Postrel |
| 2005/0080727 A1 | 4/2005 | Postrel |
| 2005/0080728 A1 | 4/2005 | Sobek |
| 2005/0096124 A1 | 5/2005 | Stronach |
| 2005/0107155 A1 | 5/2005 | Potts et al. |
| 2005/0137015 A1 | 6/2005 | Rogers |
| 2005/0143174 A1 | 6/2005 | Goldman |
| 2005/0149394 A1 | 7/2005 | Postrel |
| 2005/0177428 A1 | 8/2005 | Ganz |
| 2005/0177519 A1 | 8/2005 | Block |
| 2005/0182693 A1 | 8/2005 | Alivandi |
| 2005/0192864 A1 | 9/2005 | Ganz |
| 2005/0240472 A1 | 10/2005 | Postrel |
| 2005/0250415 A1 | 11/2005 | Barthold |
| 2005/0261056 A1 | 11/2005 | Smolucha |
| 2006/0004629 A1 | 1/2006 | Neemann et al. |
| 2006/0020511 A1 | 1/2006 | Postrel |
| 2006/0035692 A1 | 2/2006 | Kirby |
| 2006/0046827 A1 | 3/2006 | Saffari |
| 2006/0052150 A1 | 3/2006 | Hedrick |
| 2006/0063580 A1 | 3/2006 | Nguyen |
| 2006/0079150 A1 | 4/2006 | Filoseta |
| 2006/0100018 A1 | 5/2006 | Ganz |

| | | | |
|---|---|---|---|
| 2006/0148559 | A1 | 7/2006 | Jordan |
| 2006/0178217 | A1 | 8/2006 | Jung |
| 2006/0178899 | A1 | 8/2006 | Jung |
| 2006/0178964 | A1 | 8/2006 | Jung |
| 2006/0178965 | A1 | 8/2006 | Jung |
| 2006/0178966 | A1 | 8/2006 | Jung |
| 2006/0178967 | A1 | 8/2006 | Jung |
| 2006/0178968 | A1 | 8/2006 | Jung |
| 2006/0178970 | A1 | 8/2006 | Jung |
| 2006/0178972 | A1 | 8/2006 | Jung |
| 2006/0178975 | A1 | 8/2006 | Jung |
| 2006/0178985 | A1 | 8/2006 | Jung |
| 2006/0195376 | A1 | 8/2006 | Jung |
| 2006/0195377 | A1 | 8/2006 | Jung |
| 2006/0195378 | A1 | 8/2006 | Jung |
| 2006/0195394 | A1 | 8/2006 | Jung |
| 2006/0205481 | A1 | 9/2006 | Dominelli |
| 2006/0224505 | A1 | 10/2006 | Jung |
| 2006/0229976 | A1 | 10/2006 | Jung |
| 2007/0073582 | A1 | 3/2007 | Jung |
| 2007/0087822 | A1 | 4/2007 | Van Luchene |
| 2007/0167218 | A1 | 7/2007 | Rothschild |
| 2007/0168266 | A1 | 7/2007 | Questembert |
| 2007/0239523 | A1 | 10/2007 | Yi |
| 2008/0086759 | A1 | 4/2008 | Colson |
| 2009/0023490 | A1 | 1/2009 | Moshal et al. |
| 2010/0174600 | A1 | 7/2010 | Walker et al. |
| 2010/0227675 | A1 | 9/2010 | Luxton et al. |
| 2010/0248823 | A1 | 9/2010 | Smith |
| 2011/0151976 | A1 | 6/2011 | Holloway |
| 2011/0183749 | A1 | 7/2011 | Allen |
| 2011/0207525 | A1 | 8/2011 | Allen |
| 2011/0256924 | A1 | 10/2011 | McGhie |
| 2011/0275432 | A1 | 11/2011 | Lutnick et al. |
| 2012/0041810 | A1 | 2/2012 | Hofer |

FOREIGN PATENT DOCUMENTS

| | | |
|---|---|---|
| AU | 2497499 | 11/1999 |
| AU | 2497599 | 11/1999 |
| AU | 199924973 | 11/1999 |
| AU | 199924974 | 11/1999 |
| AU | 199924975 | 11/1999 |
| AU | 3018500 | 11/2000 |
| AU | 200030185 | 11/2000 |
| EP | 0308224 | 3/1989 |
| EP | 0525363 | 2/1993 |
| EP | 0949596 | 10/1999 |
| EP | 1107196 | 6/2001 |
| EP | 1399897 | 3/2004 |
| GB | 2319381 | 5/1998 |
| GB | 2333879 | 8/1999 |
| GB | 2380687 | 4/2003 |
| JP | 8235276 | 9/1996 |
| JP | 2003132224 | 5/2003 |
| WO | WO9215174 A1 | 3/1992 |
| WO | 9323817 | 11/1993 |
| WO | 9416781 | 8/1994 |
| WO | 9713228 | 4/1997 |
| WO | 9748078 | 12/1997 |
| WO | 9926176 | 5/1999 |
| WO | 9930256 | 6/1999 |
| WO | 9952051 | 10/1999 |
| WO | 9960503 | 11/1999 |
| WO | 0014665 | 3/2000 |
| WO | 0031658 | 6/2000 |
| WO | 0033159 | 6/2000 |
| WO | 0033222 | 6/2000 |
| WO | 0079461 | 12/2000 |
| WO | 0101282 | 1/2001 |
| WO | 0152078 | 7/2001 |
| WO | 0157617 | 8/2001 |
| WO | WO0164306 | 9/2001 |
| WO | WO2005006113 | 1/2005 |
| WO | 2005082480 | 9/2005 |
| WO | 2006020413 | 2/2006 |
| WO | 2009094395 | 7/2009 |

OTHER PUBLICATIONS

Non Final Rejection dated May 4, 2012; U.S. Appl. No. 13/428,656; pp. 1-6.

Notice of Allowance; U.S. Appl. No. 13/428,656; Mailing Date May 15, 2012.

Non Final Rejection dated Mar. 6, 2012; U.S. Appl. No. 13/359,120; pp. 1-7.

Notice of Allowance; U.S. Appl. No. 13/359,120; Mailing Date Apr. 18, 2012.

Non Final Rejection dated Mar. 12, 2012; U.S. Appl. No. 13/359,104; pp. 1-8.

Notice of Allowance; U.S. Appl. No. 13/359,104; Mailing Date Apr. 13, 2012.

Non Final Rejection dated Mar. 6, 2012; U.S. Appl. No. 13/359,080; pp. 1-11.

Notice of Allowance; U.S. Appl. No. 13/359,080; Mailing date Apr. 11, 2012.

Non Final Rejection dated Jan. 10, 2012; U.S. Appl. No. 12/759,506; pp. 1-10.

Notice of Allowance; U.S. Appl. No. 12/759,506; Mail date Mar. 15, 2012.

Non Final Rejection dated Dec. 15, 2012; U.S. Appl. No. 12/720,743; pp. 1-10.

Notice of Allowance; U.S. Appl. No. 12/720,743; Mailing date Jan. 24, 2012.

Non Final Rejection dated May 12, 2009; U.S. Appl. No. 11/420,255; pp. 1-7.

Notice of Allowance; U.S. Appl. No. 11/420,255; Mailing Date Dec. 16, 2009.

Non Final Rejection dated Sep. 6, 2012; U.S. Appl. No. 13/531,904; pp. 1-7.

Notice of Allowance; U.S. Appl. No. 13/531,904; Mailing Date Sep. 19, 2012.

Non Final Rejection dated Sep. 7, 2012; U.S. Appl. No. 13/532,342; pp. 1-6.

Notice of Allowance; U.S. Appl. No. 13/532,342; Mailing Date Sep. 24, 2012.

"At Sports Superstore Online, Shoppers Get More for Their Money; 10,000 Reasons to Shop at Sports Superstore Online", Business Wire Dec. 4, 1998, 2 pp.

"Amazon.com and Netflix.conn Establish Promotional Relationship for the Sale and Rental of DVD Titles" Business Wire Dec. 4, 1998, 3 pp.

Brook, Valerie. "GM turns up the heat with plan to cross-sell some financial products." Nov. 18, 1994 http://www.americanbanker.com/issues/159__150/-49630-1.html?zkPrintable=true.

"Beneficial, Casual Male Team Up on Card", American Banker. May 4, 1998. http://www.americanbanker.com.

"E-Centives," (http://www.emaginet.com/de...memfaq.shtml), download date: May 23, 1999, 3 pp.

Bloom, Jennifer Kingson. "Wal-Mart on Retail Road Less Traveled: Cobranding," The American Banker Sep. 11, 1998, 3 pp.

Elkin, Tobi "Promotions: Mastercard Wins Coveted On-Pack Real Estate in Tie-in with Microsoft" Brandweek Sep. 14, 1998, 1 page.

"Microsoft and First USA Announces $90 Million Online Advertising Alliance" EDP Weekly's IT Monitor Nov. 2, 1998, 2 pp.

Feldman, Amy "Paying with Plastic Not Such a Smart Idea", New York Daily News Nov. 4, 1998, 2 pp.

Cowell, Alan "America's Turn to Colonize; Creditcard Issuers Invade Britain, with U.S. Firepower", The New York Times Nov. 12, 1998, 5 pp.

Armstrong, Larry, "The Free-PC Game: Lure 'Em in and Lock' Em Up," Business Week, Information Technology, Jul. 19, 1999, 1 pg.

"Shoppers Charge Accounts Co. To Administer Private Label Credit Card for Lew Magram LTD; Program Marks SCA,s Entry into Retail Catalog/Mail Order Industry" PR Newswire Jun. 29, 1998, 6 pp.

"About Click Rewards." Wired Magazine. http://www.wired.com/wired/subscribe/clickmiles.html.

Souccar, Miriam K. "Epidemic of Rate Shopping Spurs a Search for remedies," Jan. 7, 1999, Copyright 1999 American Banker, Inc.

"Wellsparks Group Launches V.I.P. Rewards; The Most Comprehensive Relationship Marketing Program Ever Created by a Mall Developer", Business wire May 19, 1998, 2 pp.

"Jay Jacobs Inc. Introduces Private Label Credit Card", Business Wire May 18, 1998, 1 page.

Meece, Mickey "Big Finance Companies May Want Piece of Limited's Private-Label Card Program", The American Banker Apr. 12, 1995, 2 pp.

"Points Earn Little Credit as Cardholders Fail to Cash in" Birmingham Post May 9, 1998, 2 pp.

"Card Briefs: Beneficial, Casual Male Team Up on Card" The American Banker May 4, 1998 1 pg.

AAdvantage Auction "Experience More with You AAdvantage Miles". http://www.aa.com/il8n/urls/auction.jsp?anchorLocation=DirectURL&title=auction.

Wald, Matthew L. "Spending It; Untying Cellular Phones From Those Annual Contracts" The New York Times Mar. 15, 1998, 2 pp.

Wijnen, Renee "Cendant Eyes Cross-Marketing Opportunities; CUC International-HFS Inc. Merger Expected to Yield an Additional 2 Million Club Members" DM News Feb. 2, 1998, 2 pp.

Sanders, Edmund "Tricky Business; The Magic of Rebate Cards can Quickly Disappear", Chicago Tribune Aug. 18, 1997, 3 pp.

Simon, Ruth "Make Sure Your Rebate Card Still Delivers the Goods", Money Aug. 1997, 2 pp.

Selasky, Susan "Easy-To-Swallow Savings; Diner Credit Cards Serve Wide menu of Discounts", Pittsburgh Post-Gazette Dec. 5, 1996, 3 pp.

"Chemical Bank and AT&T Smart Cards form Strategic Alliance", www.att.com/press/1193/931117.blb.html, 3 pp.

Kristof, Kathy "Card Sharks are in Season; be Wary of Discounts and Rebates as You Shop Around for Good Credit Deals", Chicago Tribune, Nov. 23, 1993, 2 pp.

Wessel, Harry "Rewarding Experience?; Credit Cards Offering Bonuses Not for Everyone", Chicago Poet-Gazette Dec. 5, 1996, 3 pp.

Ross, Chuck et al., "Coke Card promotion set for '98", (http //adage com/news.sub.--and.sub.--features/features/19971117/article3 html), Copyright Nov. 1997, 2 pp.

Singletary, Michelle, "Electronic World, Unchecked Problem?", The Washington Post, Mar. 4, 1997, Section: Financial, p. C01, 4 pp.

Ellin, Abby, "Listening to an Earful for Savings," (Hear the Pitches and talk for Free), The New York Times, Jan. 24, 1999, 1 pg.

Cox, Beth, "Visa, Travelweb Enter Online Marketing Partnership," Internetnews.com, Jan. 21, 1999, 1 pg.

Tedesco, Richard. "Pactel Pushes Net Access." Broadcasting & Cable. Jun. 3, 1996, pp. 64-65.

Colman, Price. "Cross-marketing Cuts Cable Bills." Broadcasting & Cable. Jul. 15, 1996, p. 44, 2 pp.

O'Brien, Timothy L., "The Market: Market Place—Taking the Danger out of Danger out of Risk; Chase says Models Helped it avoid Financial Minefields," The New York Times Business/Financial Desk, Jan. 20, 1999 Section C. Column 2 at p. 1, 4 pp.

"Rent from NetFlix.com Buy from Amazon.com," Official Press Release, Jan. 17, 1999, 1 pg.

"Let's Play the Cash Register Receipts Lottery", The New York Times, Dec. 25, 1990, Section: Section 1, p. 30, col. 4, Editorial Desk, 1 pg.

Dennis, Sylvia. "Visa Gets ready for Interactive Set-Top Boxes," Newsbytes, Dec. 14, 1998, 2 pp.

"Philips offers customers financing through Citicorp; Philips Medical Systems North America, Citicorp North America Inc." Health Industry Today, Jun. 1991, Section: vol. 54, No. 6, p. 4, ISSN: 0745-4678, 1 page.

Sinclair, Stewart. "To Mail or Not to Mail?" Strategy, Strategy Directresponse Special Report, Couponing, Oct. 12, 1998 at p. D21, 4 pp.

"Winn-Dixie/The Salvation Army Report Contributions for War Against Hunger", PR Newswire, Jun. 10, 1993, Section: Financial News, 1 pg.

Armstrong, Larry. "Coupon Clippers, save Your Scissors," Vons Supermarkets are Revolutionizing the Delivery of Discounts. Business week, Jun. 20, 1994, No. 3377 at p. 164, 2 pp.

Patch, Kimberly, "Sled InterNIC Debut Internet Services; Sled Corp Offers Electronic Coupons for Encryption software; InteNIC Information Services Launches InfoGuide to Internet Computer Network" PC Week, May 16, 1994 vol. 11 No. 19 at p. 130, ISSN: 0740-1604, 1 page.

"American Eagle Outfitters" PR Newswire. Mar. 26, 2010. www.printthis.clickability.com/pt/cpt?expire=&title=American+Eagle+Outfitters%2C+Inc.+Introduces+the . . . .

Andreoli, Tom et al., "Cash Machines Offer a Whole Lotto Money . . . ", Crain's Chicago Business, Jun. 19, 1995, Section: News, p. 8, 2 pp.

Brochure: "MyPoints (R)", MotivationNet, Inc. (TM), Homepage: www.mypoints.com, Copyright: Apr. 1998, 29 pp.

Bonnici, Joseph et al., "Consumer issues in coupon usage: An exploratory analysis", Journal of Applied Business Research, winter 1996/1997, vol. 13, No. 1, pp. 31-40, ISSNn: 0892-7626, CODEN: JPBEBK, 11 pp.

Hoeschen, Brad. "Brookfield Square Hopes Mall Card Strikes a Chord," Business Journal-Milwaukee, vol. 14, No. 50, p. 19, Sep. 12, 1997, 2 pp.

Armstrong, Larry. "The Free-PC Game: Lure 'Em In and Lock' EM Up". Jul. 19, 1999 http://www.businessweek.com/1999/99_29/b3638169.htm?scriptFramed.

Iverson, Mark. "DataCard Partners With CSI to Offer Card-Based Loyalty Solution to Merchants." Jul. 19, 1998 http://www.thefreelibrary.com/_/print/PrintArticle.aspx?id=20883274.

"Cardbriefs: Stored-Value Card Designed for Casinos", The American Banker, Oct. 31, 1995, Section: Credit/Debit/ATMS, 1 pg.

"Tecmark Reward Terminal", (http //www tecmarkinc com/terminal htm), copyright, 1996 Tecmark Services, Inc., 1 pg.

WAP WTLS: Wireless Application Protocol Wireless Transport Layer Security Specification, Wireless Applications Forum, Limited, Apr. 30, 1998. [Retrieved on Jan. 19, 2009]. Retrieved from the Internet <Oct. 7, 2008>.

"Fallon:"UK Retailers Loyal Customer 'Card Wars' Prove costly (Most major retailers in the UK have grown their sales over the past 2 years by lunching loyalty-card program; Supermarket News, May 5, 1997; vol. 47, No. 18, p. 57.

Booker, Ellis, "Checkout lines to offer more than just candy and waiting", Computer World, May 21, 1990, 1 pg.

Fickenscher, Lisa, "Merchant: American Express Seeks to Mine Its Data on Cardholder Spending Patters", The American Banker, Mar. 24, 1997, Credit/Debit/ATMS, 2 pp.

Fickenscher, Lisa, "Amex to Start Free Rewards Program with Discounts on Merchandise", The American Banker, Oct. 18, 1996, Section: Credit/Debit/ATMS, p. 10, 2 pp.

Fitzgerald, Kate, "Amex program moves loyalty to next level: Custom Extras finds a medium customers can't ignore: Billing Statements", Advertising Age, Nov. 4, 1996, Section: News, 2 pp.

Amato-McCoy, Deena, "Co-Branded Acme Credit Card Rewards Loyal Users" Supermarket News, Jun. 15, 1998, Section: p. 17, ISSN: 0039-5803, 2 pp. "DataCard Partners With CSI to Offer Card-Based Loyalty Solution to Merchants", Business Wire, Jul. 9, 1998, 1 pg.

Albright, Mark, "Grocery savings via Web coupons", St. Petersburg Times, Jul. 22, 1998, Section: Business, 2 pp.

SELF-SERVICE STATIONS FOR UTILIZING NON-NEGOTIABLE CREDITS EARNED FROM A GAME OF CHANCE

CROSS-REFERENCE TO RELATED APPLICATIONS

This continuation-in-part application claims the benefit of U.S. patent application Ser. No. 11/420,255 filed 25 May 2006 entitled "Web Based Conversion of Non-Negotiable Credits Associated with an Entity to Entity Independent Negotiable Funds", U.S. patent application Ser. No. 12/720,743 filed 10 Mar. 2010 entitled "Conversion of Non-Negotiable Credits Earned from a Game of Chance to Negotiable Funds" and U.S. patent application Ser. No. 12/759,506 filed 13 Apr. 2010 entitled "Storefront Purchases Utilizing Non-Negotiable Credits Earned from a Game of Chance." The entire contents of U.S. application Ser. No. 11/420,255, U.S. application Ser. No. 12/720,743, and U.S. application Ser. No. 12/759,506 are incorporated by reference herein.

BACKGROUND

1. Field of the Invention

The present invention relates to the field of interactive, unattended service architecture, and more particularly, to performing purchases with and conversions of non-negotiable credits earned from a game of chance.

2. Description of the Related Art

Entities often reward consumers for utilizing their services with entertainment credits. These non-negotiable credits can often be applied towards products and/or services provided by a granting entity or its affiliates. The entity offering the reward can be a gambling institution and the entertainment credits can be earnings from wagers while playing a game of chance. Entertainment credits can have no value outside the gambling institution and cannot be used for purchases outside the casino. Thus, to perform purchases at venues independent of the casino with earnings, frequently patrons are required to "cash out" to change entertainment credits (e.g., casino tokens) earned from the game of chance to currency (e.g., paper money).

Many problems are inherent to the current techniques for the redemption (i.e., "cash out") of entity provided credits. One such problem is the high level of manpower necessary during the cash out and conversion process. Manpower is arguably the highest operation cost associated with any enterprise and business cost saving measures routinely begin with personnel cutbacks and subsequent automation, which can be evidence by the brokered rise of kiosks.

Another drawback of the traditional cash out procedure can be security related (i.e., it facilitates theft). Moreover, patrons of a venue may often prefer to conduct transactions utilizing a self-service kiosk rather than wait in long lines for human assistance. One area immature in automation technology is where earnings from games of chance occur.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

Figure 1:
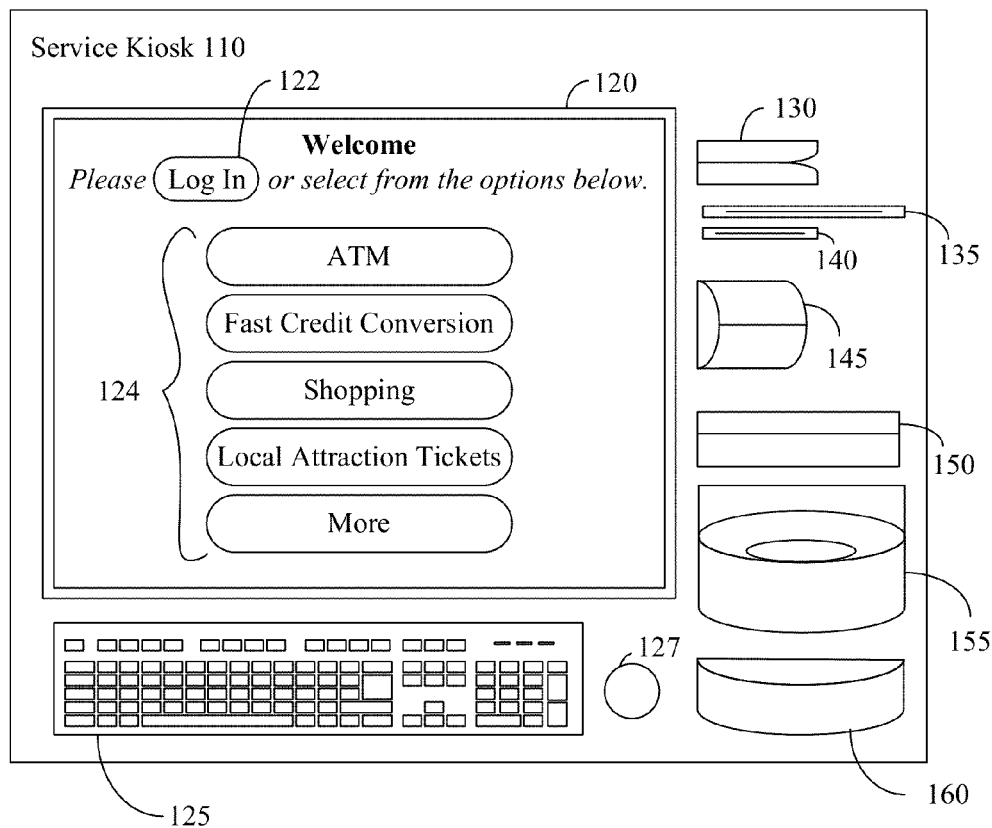
FIG. 1 is a diagram of a service kiosk in which a multitude of traditional (ATM, etc.) as well as non-traditional (i.e., entertainment credit conversion, e-commerce transactions, etc.) functions can be performed via a single machine.

FIG. 1 is a diagram 100 of a service kiosk 110 in which a multitude of traditional (e.g., automated teller machine, etc.) as well as non-traditional (i.e., entertainment credit conversion, e-commerce transactions, etc.) functions can be performed. In accordance with an embodiment of the disclosure, kiosk 110 can be an example of a multi-function kiosk. In this instance, an automated teller machine (ATM) that can be placed on the premise of say a casino or other entertainment venue can perform what can be described as classic functions of an ATM (e.g., financial account access, withdrawals, deposits, transfers, etc.) as well as other, non-traditional functions. These non-traditional functions can be associated with converting earnings from a game of chance in the form of entertainment credits to negotiable credits (e.g., currency) and the use of those negotiable credits.

Service kiosk 110 can include interactive screen 120, which can take a variety of fashions, such as a touch screen or an LCD screen with control buttons, and the like. Interactive screen 120 can display options for logging in 122 to a user account with the entertainment venue, as well as other service kiosk 110 options 124 such as an option to solely access traditional ATM functions, do a fast credit conversion, conduct e-commerce transactions (shopping), redeem credits for local attraction tickets, and the like. Service Kiosk 110 can also include keyboard 125 and mouse 127 to facilitate ease of use for the user.

Moreover, service kiosk 110 can include hardware and software components necessary for proper implementation and functions the self service kiosk 110 can allow users to perform. For example, self service kiosk 110 can include card reader 130, receipt/transaction record printer 135, voucher/earnings ticket receiver 140, bill receptacle 145, bill presenter 150, credit chip counter/coin counter 155, credit chip/coin return 160, and the like.

Card reader 130 can be utilized to read and amend information for account access via regular ATM cards, entertainment venue club cards, and the like. Voucher/earnings ticket receiver 140 can accept and read vouchers, earnings tickets, and the like, whereas bill receptacle 145 can accept paper currency (e.g., U.S. dollar bills, game paper bills, etc.) for use in performing user selected service kiosk 110 functions 124.

Bill presenter 150 can dispense paper currency (legal tender, non-legal tender such as game bills, etc.).

Entertainment credit chip counter 155 can be a dual function counter for both coins and entertainment "chips" or tokens. In one instance, credit chip counter 155 can function much like a traditional coin counter that can potentially utilize a coin counting machine technique where a typical counter of presorted coins uses a bowl with a flat spinning disc at the bottom to distribute coins around the bowl perimeter. In this instance, an opening in the edge of the bowl can be wide enough to accept only one coin at a time and coins can either pass through a light-beam counter, or can be pushed through a spring loaded cam that only accepts one coin at a time. The entertainment credit chip counter can be combined with a chip verifier (e.g., using RFID or barcode, etc.) to increase security. In another instance, chips can be encoded with information regarding the date of the earning and if the date is outside of a certain entity determined redemption date range the service kiosk may return (via chip and coin return 160) the selected unverified entertainment credit chips to the user with a prompt asking the user to please see a human teller for assistance with the remaining entertainment credit tokens.

For the purposes of this disclosure, a kiosk can be a form of interactive computer terminal that provides information access via electronic methods. Most kiosks can provide unattended access to web applications. Interactive kiosks can typically be placed in high foot traffic settings such as hotel lobbies or airports. Kiosks can perform a wide range of functions, evolving into self-service kiosks. For instance, kiosks may enable users to enter a public utility bill account number in order to perform an online transaction, or collect cash in exchange for merchandise (e.g., the Best Buy or Rosetta Stone vending machines in airports and malls).

Self-service kiosks can be hardware devices that work in combination with self service software, allowing users to perform any number of possible transactions. The method of input can, for instance, be either a keyboard, touch-screen, or both. Some kiosks can include card readers, ticket and receipt printers, bill and coin depositors, robotic product arrays, bar code scanners, identification devices including biometrics, and other more complex mechanical devices.

Terminals can be connected to the internet and can provide access to a customized, unattended version of some sort of application. Intended for both consumers and business industries, benefits include ease of access, reduced transaction time, access to information and the ability to perform multiple transactions. More specifically, benefits can be [1] Reduction in staff and real estate requirements since one employee can monitor multiple self-service kiosks; [2] Unattended operation with extended service hours and off-site locations; [3] Provide users with a more enjoyable experience boosting customer satisfaction; [4] Track usage statistics, etc.

Figure 2:
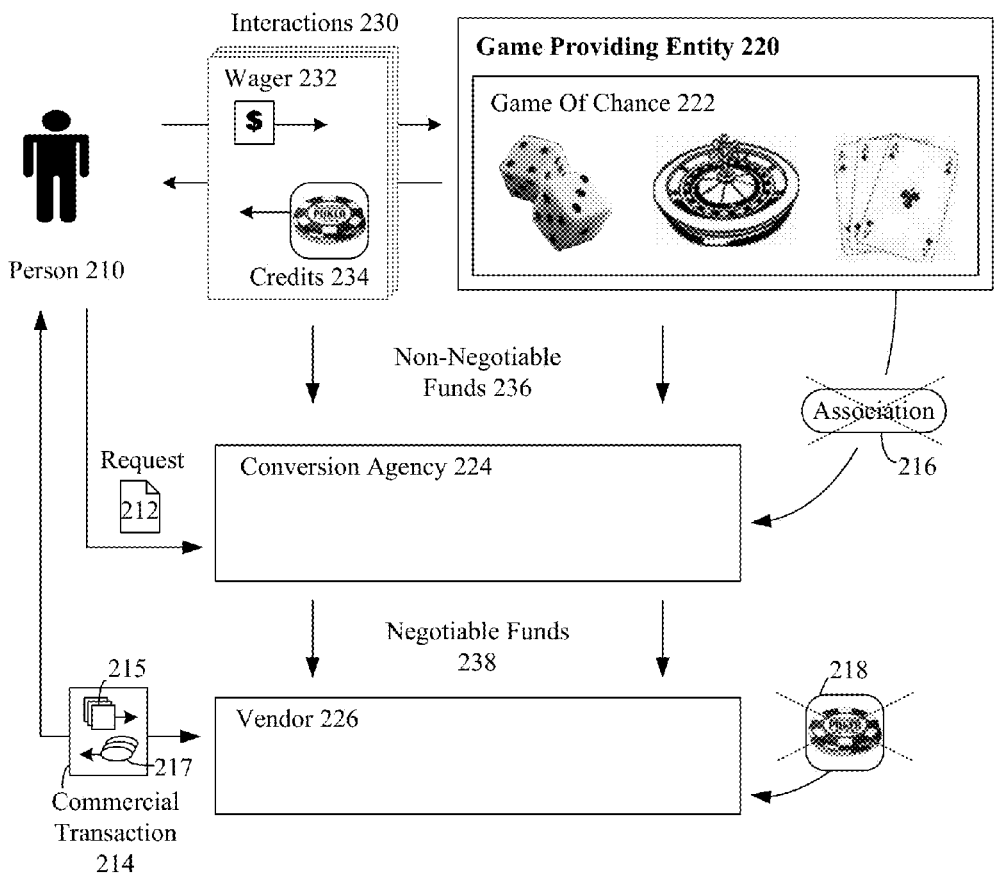
FIG. 2 is a diagram of a system in which non-negotiable funds earned from a game of chance are converted into negotiable funds in accordance with an embodiment of the inventive arrangements disclosed herein.
Figure 2:
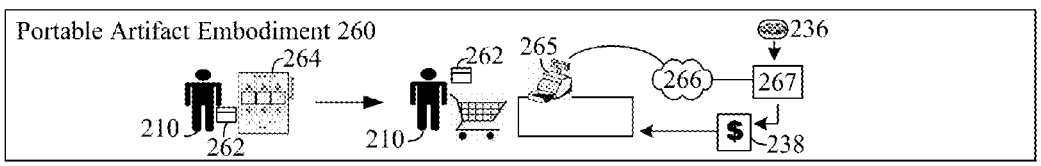
Figure 2:
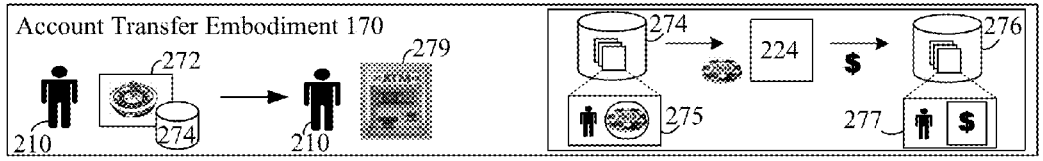

FIG. 2 is a diagram of a system 200 in which non-negotiable funds 236 earned from a game of chance 222 are converted into negotiable funds 238 in accordance with an embodiment of the inventive arrangements disclosed herein. The non-negotiable funds 136 can be used during a kiosk commercial transaction 214 to receive goods/services from a vendor 226. In one embodiment, multiple interactions 230 can occur between a person 210 and a game providing entity 220, in which the person 210 plays a game of chance 222. During each interaction 230, an optional wager 232 can be made. With each successful outcome of the game of chance 222, person 210 can receive entertainment credits 134. With each non-successful outcome of the game of chance 222, the person 210 can lose their wager 232 (if one is made).

The entertainment credits 234 are non-negotiable funds 236. These funds 236 (e.g., the entertainment credits 234) may not be redeemable on an open market. For instance, vendor 226 will not accept 218 the entertainment credits 234 for commercial transactions 214. A conversion agency 224, which is not directly associated 216 with the game providing entity 220 can convert the non-negotiable funds 236 (which can be a quantity of entertainment credits 234) into negotiable funds 238. This conversion can occur in response to a request 212 by person 210. The request 212 can be explicit or implied. For instance, a person can provide vendor 226 with the non-negotiable funds 236, which causes the vendor 226 to convey funds 236 to the conversion agency 224 and receive negotiable funds 238 in return. Thus, a sequence of events between the request 212, commercial transaction 214, conversion agency 224, vendor 226, and person 210 can be altered and still be considered within scope of the disclosure. Further, delays can be introduced in the fund conversion process (between funds 236 and 238), as can different types of fund-based transactions, such as loans, pre-payment, post-payments, and the like. For instance, conversion agency 224 can advance the vendor 226 a quantity of negotiable funds 238, which is legally considered a loan made by the conversion agency 224 to the person 210. The game providing entity 220 can repay the loan to the conversion agency 224 for the person 210.

Person 210 can conduct a commercial transaction 214 with vendor 226. During the transaction 214, the person 210 can specify a user-selected set of requests 215 for goods and/or services 217 of the vendor 226. The goods and/or services 217 can cost a quantity of negotiable funds 238, which are provided to the vendor 226. In one embodiment, the negotiable funds 238 can be provided directly to the vendor 226 by the conversion agency 224. In another, the negotiable funds 238 can be provided by the conversion agency 224 to person 210, who provides these funds 238 to the vendor 226.

Numerous embodiments exist for conducting the conversions as described herein, a few of which are shown as embodiments 260 and 270. Embodiment 260 shows a portable artifact embodiment, where a person 210 stores entertainment credits 234 from the game of chance 222 upon a portable artifact 262, which can be a physical card with a magnetic strip, a RFID storage device, a flash memory card, a paper voucher, or other tangible artifact able to store digitally encoded (analog encoded, or even paper encoded or written) data. Machines 264 upon which the games of chance 222 are played can include a reader/writer able to alter content stored on the portable artifact 262. In one embodiment, the "writer" can print vouchers to paper. The reader/writer need not be integrated into the machine 264, but can be a separate machine, in one embodiment of the disclosure.

In one configuration, wagers 232 can be made from value stored on the artifact 262 and earnings (e.g., credits 234) can be recorded on the artifact 262. The person 210 can thereafter shop at a kiosk of vendor 226 and present a cashier 264 with the artifact 262. A cash register 265 used by the cashier 264 can be connected to a network 266. The conversion agency 224 can have a network element 268 connected to the network 266, which converts non-negotiable funds 236 on the artifact 262 into a quantity of negotiable funds 238 needed to complete the commercial transaction 214 conducted via the register 265 and cashier 264. From the perspective of the vendor 226, the transaction 214 conducted via the register 265 is a "standard" transaction that results in the vendor 226 receiving suitable negotiable funds 238 for providing the goods/services 217 to person 210. In another embodiment, a "non-standard" transaction can occur, which involves the vendor 226 performing an additional set of one or more steps to explicitly convert the non-negotiable funds 236 to negotiable funds 238.

Embodiment 270 shows an account transfer embodiment 270, where a person 210 plays a game of chance 222. Earnings (e.g., 234, 236) from the game of chance 222 are recorded within a tangible data store 274 associated with the game providing entity 220. This data store 274 can include an account 275 for the person 210, which tracks an amount of entertainment credits 234, which are non-negotiable funds 236, of the person 210. Conversion agency 224 can directly access the account 275 of data store 274 and can convert a quantity of credits 234 into negotiable funds 238, which are recorded in a tangible data store 276 that is not directly associated with entity 220. The data store 276 can include an account 277 for the person 210, which contains an amount of negotiable funds 238, of the person 210. A person 210 can conduct commercial transactions 214 via a machine 279, such as a kiosk, an ATM machine, etc., which involve funds of account 277 changing. In one embodiment, the goods/services 217 received from person 210 in embodiment 270 can include cash (such as from an ATM machine). This cash can be an amount of cash-back received during transaction 214, can be the transaction 214 itself and may involve a transaction fee, which is extracted from account 277 by machine 279.

The embodiments 260, 270 are for illustrative purposes only and are not intended to be (or to be construed as being) exhaustive or comprehensive. For instance, any combinations of the embodiments 260, 270 are to be considered within scope of the disclosure. In a contemplated configuration, entertainment credits earned via machine 264 and placed on artifact 262 (per embodiment 260), which can be placed in a machine 279, such as an ATM (per embodiment 270) to extract funds 238, which are converted (by agency 224) from the credits 234 stored on artifact 262.

In one embodiment, the conversion agency 224 can be compensated (e.g., charge a processing fee) for converting the non-negotiable funds 236 to negotiable funds 238. This fee can be paid to conversion agency 224 by the game providing entity 220, the person 210, and/or by the vendor 226.

As used herein, a game of chance 222 can be a game in which an outcome is at least partially determined by random variables rather than strictly by strategy. There can be a level of "skill" or strategy involved in a game of chance 222, which can increase a person's 210 odds of a positive outcome. Common devices used in a game of chance 222 to add a significant random variable include dice, spinning tops, playing cards, roulette wheels, numbered balls drawn from a container, use of a computer or machine generated random number, and the like. Games of chance can also involve betting on an outcome of sports events and other such competitive games having an uncertain outcome.

Many (but not all) games of chance 222 are designed so that statistical odds favor the "house" or the game providing entity 220. That is, statistically, a large set of interactions 230 involving wagers 232 and credits 234 (assuming for the moment that the wagers 232 are credit 234 based wagers) will result in a net gain of credits 234 to the game providing entity 220 receiving more credits 234 (as wagers 232) than they provide (as winnings) over a relatively large set of interactions 230. Stated differently, a game of chance 222 can have mathematically-determined odds that ensure the house (e.g., game providing entity 220) has at all times an advantage over the players (e.g., person 210). This can be expressed more precisely by the notion of expected value, which is uniformly negative (from the player's (person 210) perspective). This advantage is called the house edge. In games of chance 220 such as poker where players (210) play against each other, the house (entity 220) takes a commission called the rake.

A game of chance 222 does not necessarily involve a wager 232, though it may. For instance, sweepstakes are a type of a game of chance 222, which may (e.g., lottery) or may not (e.g., promotional sweepstakes) involve a wager 232. A promotional sweepstakes can be a marketing promotion targeted towards both generating enthusiasm and providing incentive reactions among customers by enticing consumers to submit free entries into drawings of chance that are tied to product or service awareness wherein the featured prizes are given away by sponsoring companies.

A game of chance 222 is defined herein to include any type of gambling game or event. In many jurisdictions, local as well as national, gambling (e.g., games of chance 222) are banned, heavily controlled by licensing, and/or are subject to government regulations and restrictions. Under US federal law, gambling is legal in the United States, and states are free to regulate or prohibit the practice. Thus, any event of uncertain outcome that is subject to state (or federal) regulations under a gambling statute is to be considered a game of chance 222 and within scope of the inventive arrangements (and claims) detailed herein. Because American Indian reservations are considered federally granted lands not subject to state regulation in the same way as other lands, many reservations geographically located in states that prohibit gambling (e.g., games of chance 222) are permitted to provide these games of chance 222, since the lands are not subject to state gambling laws. Similarly, cruise ships that travel outside state jurisdictions, often permit gambling (considered a game of chance 222 for purpose of the claims/disclosure) once the ships are located in international waters.

Games of chance 222 can involve a variety of machines (e.g., 264, 272). In many instances regulations (typically under state gambling statutes) can impose that odds in these gaming devices be statistically random, which helps to prevent manufacturers from making some high-payoff results impossible.

Games of chance 222 can include, but are not limited to, the following types of gambling: casino games, table games, fixed odd betting, pari-mutuel betting, sports betting, and the like. Specific games of chance 222 include, but are not limited to, Craps, Roulette, Baccarat, Blackjack, Poker, Pachinko, slot machines, Video poker, Bingo, Keno, dead pool, lotteries, pull-tab games and scratch cards, Mahjong, card games (e.g., Liar's poker, Bridge, Basset, Lansquenet, Piquet, Put, Teen Patti), carnival games (e.g., The Razzle or Hanky Pank), coin tossing games (e.g., Head and Tail, Two-up), confidence tricks (e.g., Three-card Monte or the Shell game), dice-based games (e.g., Backgammon, Liar's dice, Passe-dix, Hazard, Threes, Pig, or Mexico), horse or greyhound racing, sports outcome betting, and the like.

Game providing entities 220 include any entity providing a game of chance 222 to others (person 210), where entertainment credits 234 can be earned. Game providing entities 220 can include casinos, cruise ships, States (for lottery, scratch off games, etc.), churches (e.g., running bingo games), race tracks, online gambling site providers, slot-machine houses, carnivals, gambling parlors, companies (for promotional sweepstakes), High Schools (for raffles), and the like.

The wager 232 can be bet in an outcome of winning a game of chance 222. The wager 232 can risk money, previously earned entertainment credits 234 or something of material value on an event with an uncertain outcome with an intent on winning additional money, credits 234, and/or material goods/services. Typically the outcome of a wager 232 is evident within a short period (such as a duration of the game of chance 222). An amount of entertainment credits 234 earned from winning the game of chance 222 can vary in direct proportion to an amount of the wager (or the stake, which is placed at risk against the uncertain outcome.) A wager 232 can have odds associated with it.

Entertainment credits 234 are non-negotiable funds 236 that generally have no value outside of an environment (building, Web site, etc.) of the game providing entity 220. For instance, casinos (one embodiment of entity 220) generally utilize casino tokens, chips, or plaques to represent a quantity of entertainment credits 234.

Use of entertainment credits 234, such as casino tokens, can be more convenient than use of negotiable funds 238 for many reasons. For instance, use of entertainment credits 234 makes theft and counterfeiting more difficult. Entertainment credits (which when having a physical representation are often a uniform size and weight) can be relatively easy to stack, count, etc. Additionally, studies have proven people (210) gamble more freely (play games of chance 222 with larger wagers 232 and frequency), when entertainment credits 234 than when wagering 232 with cash or other negotiable funds.

Additionally, use of entertainment credits 234, can have legal benefits that can permit entities 220 to conduct games of chance 222, which would be prohibited if negotiable funds 238 were utilized instead of entertainment credits 234. That is, numerous legal statutes and regulations exist that are more restrictive when gambling earnings are in a form of negotiable funds 238. For instance, the Unlawful Internet Gambling Enforcement Act (UIGEA) of 2006 prohibits many online gambling activities with negotiable funds 238, which are permitted with certain forms of non-negotiable funds 236. For instance, electronic fund transfers via credit cards or debit cards related to gambling winnings are generally prohibited by US banks. Similarly, wire transfers of negotiable funds 238 earned through games of chance 222 are legally prohibited in many instances. Many of these acts explicitly prohibit the transfer of negotiable funds from gambling earnings across state lines.

Non-negotiable funds 236 can include any of a variety of financial instruments that are not legal currency and not governed under article 3 of the Uniform Commercial Code (UCC). For instance, non-negotiable funds 236 can include IOUs issued by the game providing entity 220. In one embodiment, non-negotiable funds 236 can include secured transactions, which take a security interest on collateral owned by the game providing entity's 220 assets, which are subject to Article 9 of the UCC. In one embodiment, the non-negotiable funds 126 can include letters of credit, issued by the game providing entity 220.

Negotiable funds 238 comprise a set of negotiable instruments, which are a specialized type of "contract" for the payment of money that is unconditional and capable of transfer by negotiation. As payment of money is promised later, the instrument itself can be used by the holder in due course frequently as money. Common examples include checks, banknotes (paper money), and commercial paper. Thus, negotiable funds 238 include currency, and instruments covered by Article 3 and 4 of the Uniform Commercial Code. For a writing to be a negotiable instrument under Article 3,[1] the following requirements must be met: 1) The promise or order to pay must be unconditional; 2) The payment must be a specific sum of money, although interest may be added to the sum; 3) The payment must be made on demand or at a definite time; 4) The instrument must not require the person promising payment to perform any act other than paying the money specified; 5) The instrument must be payable to bearer or to order. Additionally, negotiable funds include commercial paper, letters of credit (governed by Article 5 of the UCC), Bills of lading (governed by Article 7 of the UCC), securities (governed under Article 8 of the UCC), and deeds and other documents. One important consideration for many negotiable instruments (funds 238) is that they are payable to a bearer on demand.

The commercial transaction 214 can be one in which wherein the quantity of negotiable funds 238 are applied to user (210) specified (e.g., via request 215) purchase of a good or service 217. Stated differently, a commercial transaction can be an economic transaction where person 210 receives a good or a service from vendor 226 for value. Commercial transactions 214 can include a sale goods (217) from a kiosk, a Web site, a catalog (mail order), over the phone, and the like. Transaction 214 can also include a payment for a service requested by person 210. Payment of the negotiable funds 238 during the commercial transaction 214 can occur before, after, or concurrent with the receipt (or shipping) of the goods or service 217. A contract (including specifics established by the parties (210 and 226) as well as legal defaults provided by the UCC or applicable common law/state law) between the vendor 226 and person 210 established as part of the commercial transaction 214 can determine when payment (funds 238) for the goods/services 217 is due. In one embodiment, commercial transaction 214 can include transaction where currency is provided to person 210 by a vendor 226 (e.g., a bank as part of an ATM transaction) for a fee. This currency can be provided as a loan or as a withdrawal from an account of person 210, where the account includes the negotiable funds 238.

The conversion agency 224 can be a legal entity that converts non-negotiable funds 236 (including entertainment credits 234) into negotiable funds 238. The conversion agency 224 can lack a direct association 216 with the game providing entity 220. In one embodiment, no legal relationship of enablement of corporate identity (no parent, subsidiary, etc.) relationship can exist between the conversion agency 224 and entity 220. No fiduciary duties under corporate law can exist between agency 224 and game providing entity 220. In one embodiment, agency 224 can be geographically located outside property owned or leased by the game providing entity 220. In another, it can lease space and provide its services from entity 220 owned/leased land. In one embodiment, the conversion agency 224 can support multiple different game providing entities 220, which can be competitors of each other.

In one embodiment, the conversion agency is not a bank or similar financial institution (and may therefore be outside the guidelines established by UIGEA and other statues and regulations, which impose restrictions on banks). In one embodiment, the conversion agency 224 may be located in the same jurisdiction as the game providing entity (possibly to avoid legal entanglements/restrictions with operating in multiple or across jurisdictional boundaries) or may be located in a jurisdiction with favorable rules for performing the fund conversions.

Figure 3:
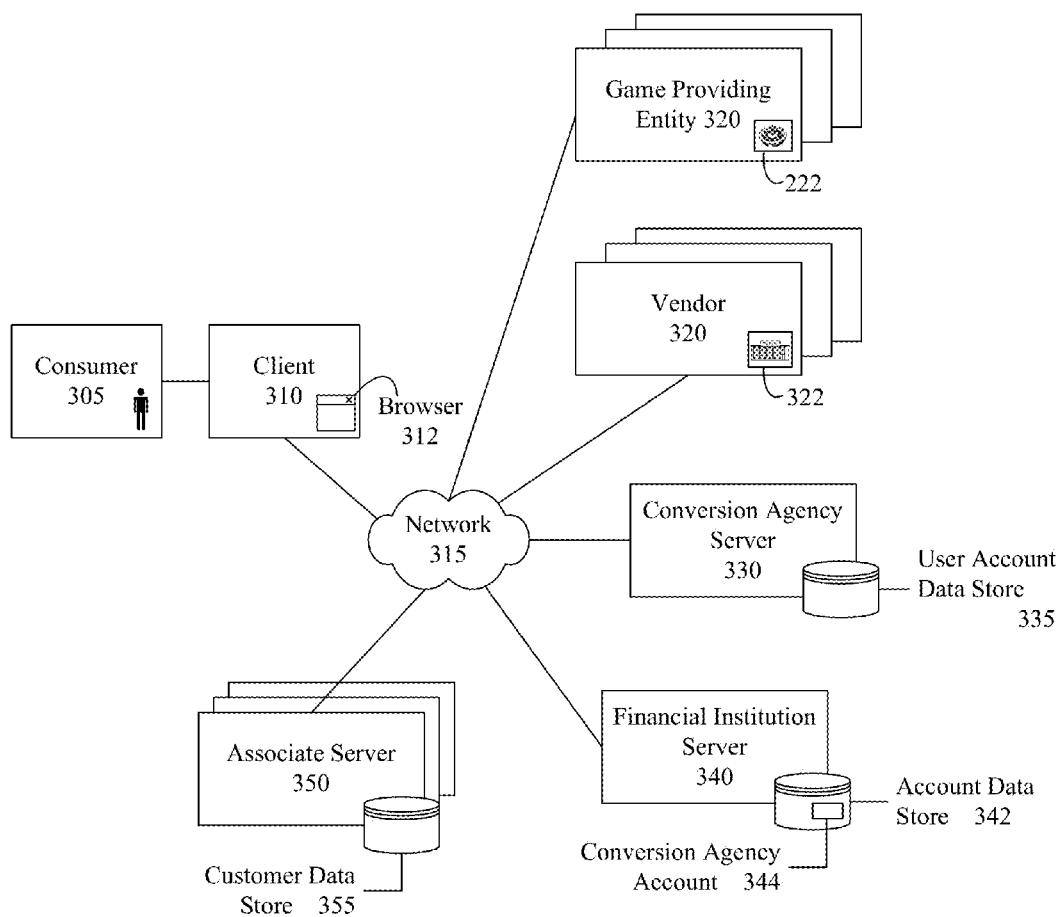
FIG. 3 is a schematic diagram of system for converting non-negotiable credits associated with a game providing entity to negotiable funds in accordance with an embodiment of the inventive arrangements disclosed herein.

FIG. 3 is a schematic diagram of system 300 for converting non-negotiable credits associated with a game providing entity to negotiable funds in accordance with an embodiment of the inventive arrangements disclosed herein. System 300 can represent a specific embodiment of system 200.

In system 300, consumer 305 can interact with a game of chance 222, such as through a game providing entity 220 (e.g., casino). Interactions can occur via a physical interaction with game of chance objects (e.g., dice, playing cards) or via a browser 312, rich internet interface, or other software executing upon client 310. Consumer 305 can purchase goods/services from kiosk 322 provided by vendor 320. These goods/services can be purchased using negotiable funds that a conversion agency server 330 provides. The conversion agency server 330 can convert entertainment credits resulting from earnings of a game of chance (non-negotiable funds) into the negotiable funds.

Client 310 can be any of a variety of devices including, but not limited to, a personal computer, a kiosk, a telephone, a personal data assistant (PDA), a mobile phone, a slot-machine, an electronic poker game, and the like. Client 310 can include hardware, such as a processor, a memory, and a bus connecting them (as can server 330, 340, and/or 350). The hardware can execute computer program products (software/firmware) that is stored in a non-transitory storage medium. In one embodiment, client 310 can operate in a stand-alone fashion. Alternatively, client 310 can be a device that cooperatively participates in a network of distributed computing devices. Network 315 can facilitate data exchanges over wireless as well as line-based communication pathways and protocols.

In one embodiment, consumer 305 and conversion agency server 330 can interact with associate server 350 and/or financial institution server 340 via network 315. Consumer 305 can interact physically with vendor 320 via kiosk 322. In one embodiment, vendor 320 may be accessible via a specialized type of kiosk 322 (i.e., a specialized web terminal not a generic browser as interface design for interactive kiosks typically requires larger buttons and simpler decision trees than designing for a web or computer based interactive) that may or may not be solely accessible on premises of the game providing entity 220 or via a user 210/consumer 305 member page to the game providing entity 220.

Conversion agency server 330 includes user account data store 335 in which consumer 305 is a member. Associate server 350 includes customer data store 355 in which consumer 305 is a member. The server 350 can be a server that maintains funds for a club or organization. For instance, an entertainment club can require members to contribute a membership fee, where the membership fees are maintained by the server 350. Financial institution server 340 includes account data store 342. Account data store 342 includes conversion agency account 344 corresponding to conversion agency 330.

Consumer 305 can earn non-negotiable credits from games of chance provided by game providing entity 320. These earnings (e.g., entertainment credits) can be managed by associate server 350 or consumer 305 (e.g., tokens). The quantity of these non-negotiable credits can be saved in customer data store 355. Consumer 305 (or vendor 320) can use conversion agency server 330 to convert the non-negotiable credits from associate server 350 into negotiable funds provided to the vendor 320 or financial institution 340. In one embodiment, conversion agency 330 can maintain multiple accounts for the consumer 305. These different accounts can be associated with different game providing entities, and with different types of non-negotiable credits.

For instance, consumer 305 can earn five hundred credits from participating in a game of chance provided by game providing entity 220. Consumer 305 can choose to use conversion agency 330 to convert any or all of these credits to a monetary equivalent prior to initiating a purchase at a kiosk 222. In one embodiment, kiosk 222 can include a means for consumer 305 to convert entertainment credits prior to initiating a purchase via a separate vendor 320 site accessible through the kiosk 222 (e.g., kiosk 222 may be a multifunction kiosk that can include modules to perform ATM as well as e commerce functions). Conversion agency 330 withdraws the necessary amount from conversion agency account 344 contained within the account data store 342 of financial institution 340 and transfers it to an account specified by consumer 305 (or by vendor 320). In another example, consumer 305 uses conversion agency 330 to complete a purchase at kiosk 222. Again, conversion agency 330 withdraws the necessary amount from conversion agency account 344 contained within the account data store 342 of financial institution 340 and transfers it to the account of e-commerce server 320.

Vendor 320 can provide a checkout system that supports purchases of goods or services with non-negotiable credits provided by consumer 305. In one embodiment, an intermediary financial object, such as a voucher, can be imposed between the entertainment credits (non-negotiable funds) and the negotiable funds that the vendor 320 receives. In one embodiment, the intermediary financial object can be restricted to a specific set of one or more vendors 320. For instance, the intermediary financial object can be a set of credits (e.g., a prepaid card) usable at a specific vendor. For purposes of the disclosure, it is unimportant as to whether the optional intermediate financial object is a negotiable instrument or a non-negotiable instrument, and it can be either depending on implementation specifics. Ultimately (regardless of a presence or lack of intermediary artifacts and steps), the vendor 320 receives negotiable funds 238 for providing goods/services to the consumer 305 and entertainment credits 234 (non-negotiable funds 236) are used towards the payment for the received goods/services. A commercial transaction (e.g., transaction 214) with the vendor 320 can involve the expenditure of entertainment credits in one embodiment. In another, the consumer 305 can be required to expend a mixture of negotiable funds and non-negotiable funds (entertainment credits 234) as payment for the vendor 320 provided goods/services.

In one embodiment, vendor 320 can include a distinct payment option in a kiosk checkout system for conversion agency 330. In one embodiment, this distinct payment option could process the conversion of credits through an interactive kiosk.

Financial institution server 340 can be any of a variety of entities including, but not limited to, a bank, a credit card company, an investment firm, and the like. In one embodiment, financial institution server 340 can reside in the same country as consumer 305 associate server 350, and/or game of chance server 320. In another embodiment, financial institution server 340 can reside in a country other than that of consumer 305 and/or associate server 350.

As shown herein, data stores 355, 335, 342, 276, 274, and the like can be physically implemented within any type of hardware including, but not limited to, a magnetic disk, an optical disk, a semiconductor memory, a digitally encoded plastic memory, a holographic memory, or any other recording medium. Each of the data stores 355, 335, 342, 276, 274 can be stand-alone storage units as well as a storage unit formed from a plurality of physical devices, which may be remotely located from one another. Additionally, information can be stored within each data store 355, 335, 342, 276, 274 in a variety of manners. For instance, information can be stored within a database structure or can be stored within one or more files of a file storage system, where each file may or may not be indexed for information searching purposes.

The network 315 can include any hardware/software/firmware necessary to convey digital content encoded within carrier waves. Content can be contained within analog or digital signals and conveyed through data or voice channels and can be conveyed over a personal area network (PAN), a local area network (LAN), or a wide area network (WAN). The network 315 can include local components and data pathways necessary for communications to be exchanged among computing device components and between integrated device components and peripheral devices. The network 315 can also include network equipment, such as routers, data lines, hubs, and intermediary servers which together form a packet-based network, such as the Internet or an intranet. The network 315 can further include circuit-based communication components and mobile communication components, such as telephony switches, modems, cellular communication towers, and the like. The network 315 can include line based and/or wireless communication pathways.

Figure 4:
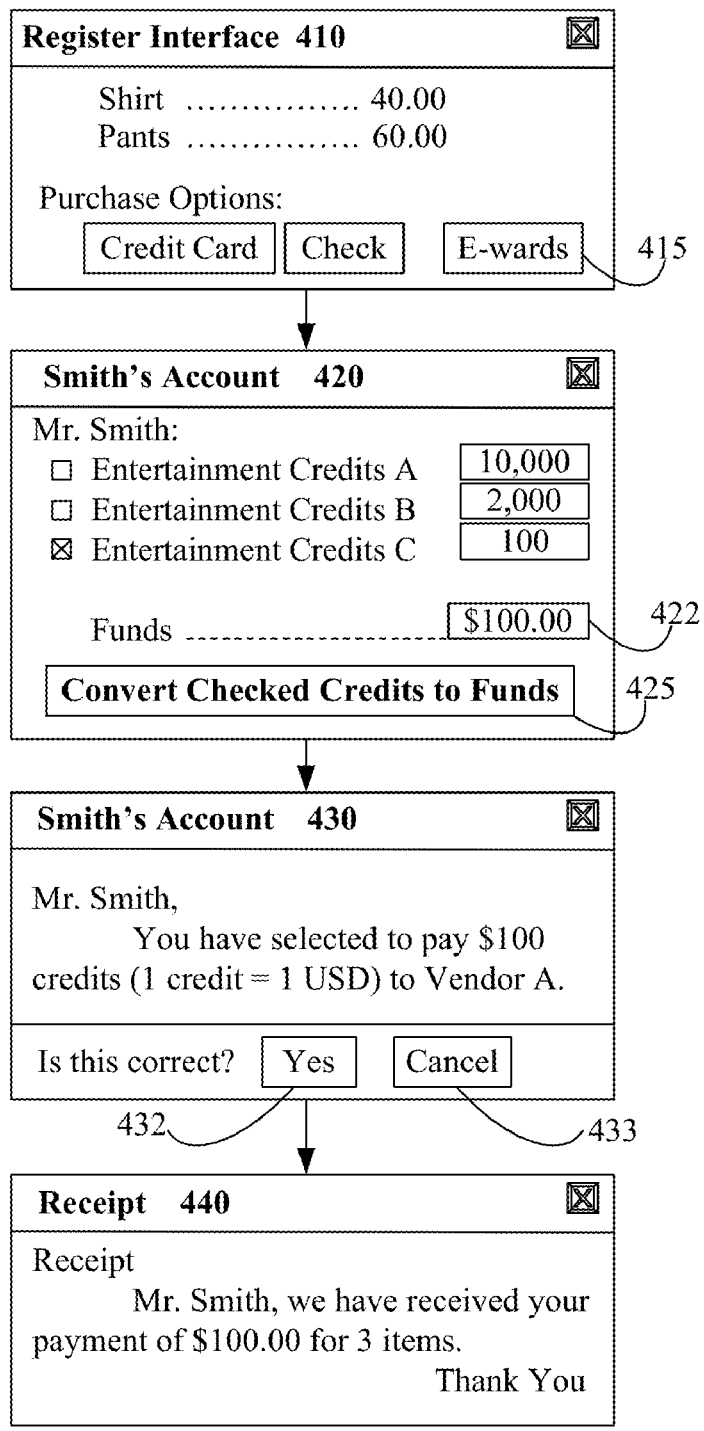
FIG. 4 is a schematic diagram of successive GUIs that illustrate the kiosk based conversion of non-negotiable credits associated with an entity earned from a game of chance to entity independent negotiable funds in accordance with an embodiment of the inventive arrangements disclosed herein.

FIG. 4 is a schematic diagram of successive GUIs that illustrate the kiosk based conversion of non-negotiable credits associated with an entity to entity independent funds in accordance with an embodiment of the inventive arrangements disclosed herein. The GUIs can be provided on a single machine, or can be provided on a set of two or more devices. For instance, the GUIs used to convert entertainment credits to funds (e.g., GUI 420) can be part of a separate device that converts entertainment credits to vendor accepted vouchers (instead of to funds 425), where the voucher can be used to complete a kiosk purchase.

GUI 402 shows an interface from a checkout system (e.g., checkout register) associated with a kiosk type game of chance 222. A quantity of entertainment credits are earned and can be converted by a conversion agency for use in buying items from a vendor 320, who does not accept the entertainment credits.

GUI 410 can be an interface window from checkout register or other kiosk check-out device (e.g., a self-service kiosk). GUI 410 includes payment button 415, which represents a payment option that includes the conversion of non-negotiable credits to purchase the items in the shopping cart. Selection of payment button 415 by a user can produce GUI 420.

GUI 420 can be an interface window from a conversion agency. GUI 420 includes display box 422 and button 425. GUI 420 can be rendered by any of a variety of means including, but not limited to, a Web browser, a JAVA applet, a PERL script, and the like. In one embodiment, GUI 420 can be contained within checkout register. GUI 420 can display the balance of non-negotiable, entertainment credits earned from one or more game providing entities. GUI 420 contains a means by which the user selects the type of non-negotiable credits to convert including, but not limited to, a set of radio buttons, a set of checkboxes, a highlighting mechanism, and the like. Display box 422 can display the monetary value of the selected non-negotiable credits. The value displayed in display box 422 can be based on preset conversion factors. Button 425 can represent the initiation of the process by which the selected non-negotiable credits are converted to negotiable funds. Selection of button 425 by a user can produce GUI 430.

GUI 430 can be a display window from a conversion agency. GUI 430 includes yes button 432 and cancel button 433. GUI 430 can be rendered by any of a variety of means including, but not limited to, a Web browser, a JAVA applet, a PERL script, and the like. In one embodiment, GUI 430 can be contained within the checkout register. GUI 430 can display a summary message of the transaction initiated by GUI 420. GUI 430 can include a means to continue the transaction, yes button 432, and a means to cancel the transaction, cancel button 433. Selection of cancel button 433 by a user cancels the transaction and can return the user to GUI 420. Selection of yes button 432 by a user completes the transaction initiated in GUI 420 and can produce GUI 440.

GUI 440 can be a display window from the same said checkout register. GUI 440 can contain a message acknowledging the successful conversion of the user's non-negotiable credits into negotiable funds for the purchase of the items in the shopping cart.

Figure 5:
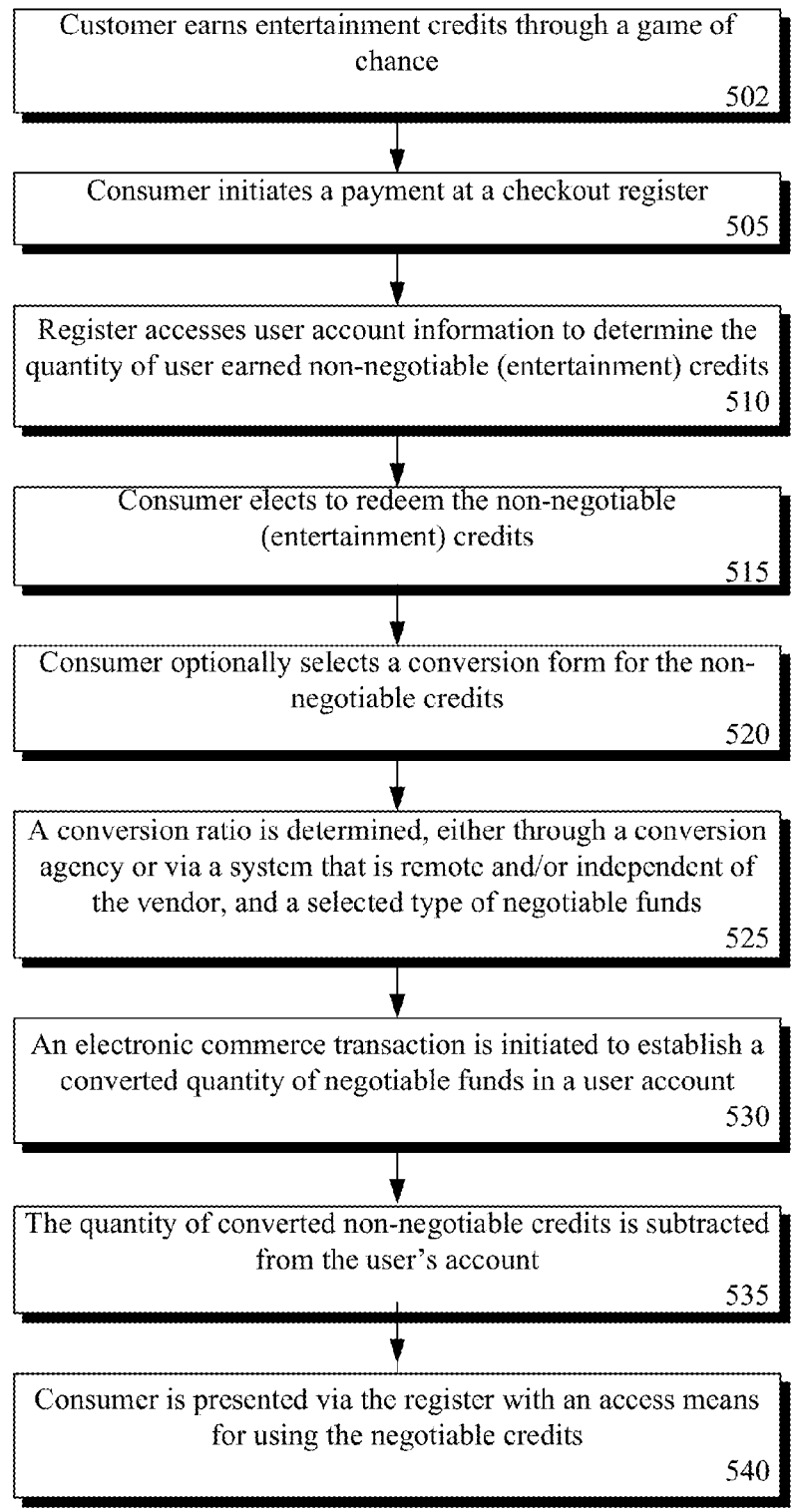
FIG. 5 is a flow chart of a method for the kiosk based conversion of non-negotiable, entertainment credits to negotiable funds system in accordance with an embodiment of the inventive arrangements disclosed herein.

FIG. 5 is a flow chart of a method 500 for the kiosk based conversion of non-negotiable, entertainment credits to negotiable funds system in accordance with an embodiment of the inventive arrangements disclosed herein.

Method 500 can begin in step 502, where a customer earns entertainment credits through a game of chance. In step 505, the consumer can initiate a payment by utilizing a portable artifact 262. In step 510, user information provided in step 505 to access the consumer's account information can display the amount of non-negotiable credits in the consumer's account. The consumer elects to redeem some quantity of non-negotiable credits in step 515. If supported by the checkout register, step 520 can occur in which the consumer can select the form of negotiable funds to convert the non-negotiable credits. In step 525, a ratio is determined for the conversion of the non-negotiable credits to the selected type of negotiable funds. This ratio can be determined by any of a variety of means including, but not limited to, an algorithm internal to conversion agency, an algorithm contained in a system that is remote and/or independent of the vendor, and the like. An electronic commerce transaction is initiated in step 530 to establish the converted amount of negotiable funds in a user account. The quantity of converted non-negotiable credits is subtracted from the user's account in step 535. In step 540, the checkout register presents the consumer with an access means for the negotiable funds.

Figure 6:
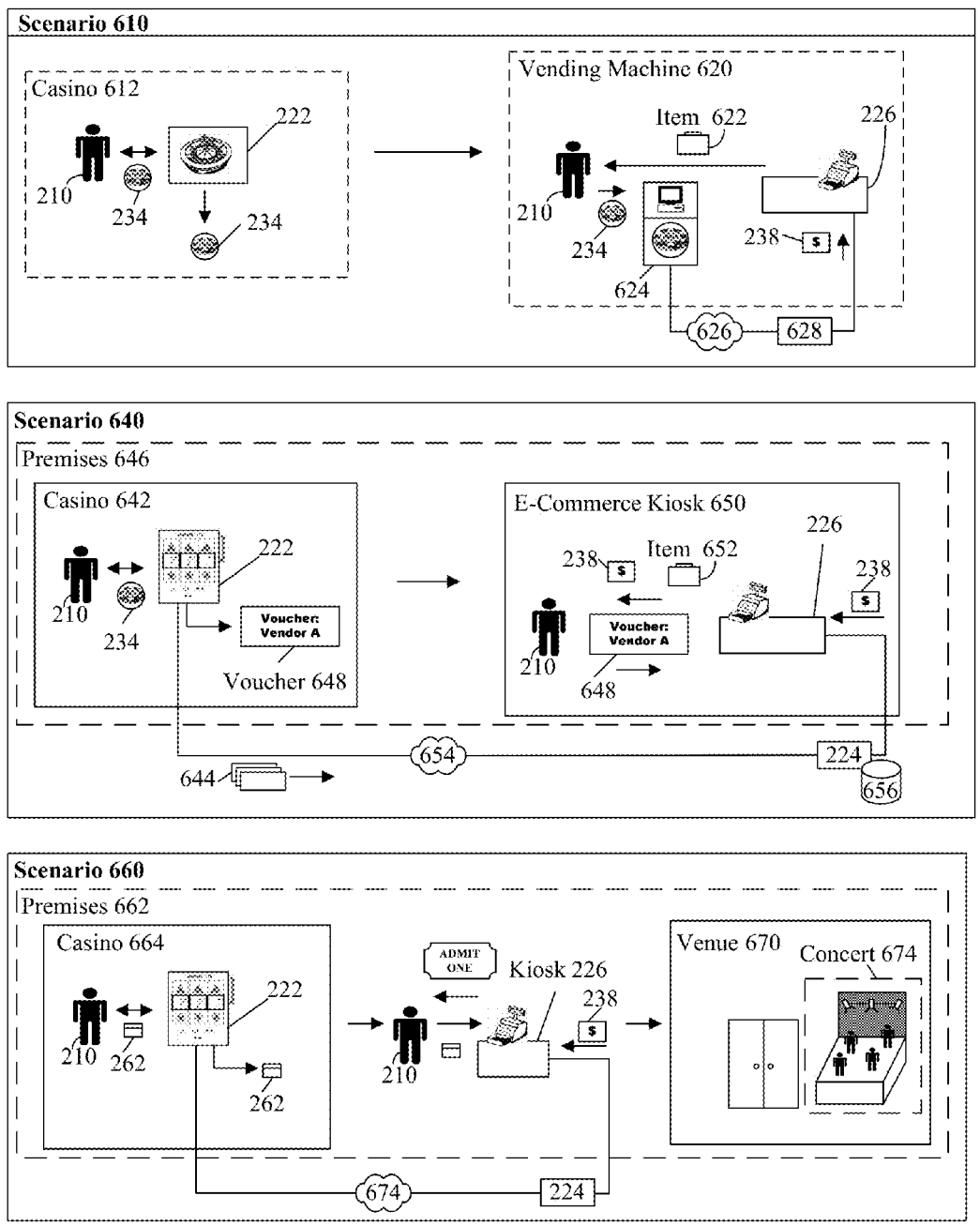
FIG. 6 is a schematic diagram illustrating a set of scenarios for performing a purchase from a vendor utilizing non-negotiable credits earned from a game of chance in accordance with an embodiment of inventive arrangements disclosed herein.

FIG. 6 is a schematic diagram illustrating a set of scenarios 610, 640, 660 for performing a purchase from a vendor via an interactive terminal utilizing non-negotiable credits earned from a game of chance in accordance with an embodiment of inventive arrangements disclosed herein. In FIG. 6, the scenarios 610, 640, 660 can include a person 210 interacting with game of chance 222 to obtain goods and/or services from vendors which are independent of casino 612, 654, 664. In scenarios 610, 640, 660, entertainment credits 234 can be utilized to interact with the game of chance 222. Earnings from game of chance 222 can be presented to user 210 in one or more forms of non-negotiable credit. Non-negotiable credit can be used to purchase goods/services from independent vendor 226 utilizing credit 234, voucher 238, and/or portable artifact 262.

In scenario 610, vendor 226 interactive terminal 624 can be proximately located to casino 612. For instance, casino 512 can be located on a first floor of a building and vending machine 620 can be located on the second floor. Person 210 can interact with a game of chance 222 to obtain entertainment credits 234 which can be casino chips. Person 210 can navigate to vending machine 620 where credits 234 can be used to purchase item 622 from independent vendor 226. In one instance, person 210 can utilize machine 624 to perform payment actions associated with the item purchase transaction. That is, person 210 can utilize machine 624 to pay for item 622 using credits 234.

In another embodiment, interactive terminal may be integral to an establishment's guest rooms, which may or may not be independent of the gambling establishment, and can be utilized to order items such as room service or book on or off site services (e.g., spa appointments and the like) utilizing entertainment credits 234 directly from an interface that can be located in user 210's guest room (e.g., via a program on the room TV or a separate machine entirely).

When payment is required for item purchase transaction, the payment information can be communicated to machine 624 from vendor 226. For instance, a self-service kiosk 624 GUI can present person 210 with an electronic bill for item purchase. Person 210 can interact with machine 624 to complete the payment for the food purchase transaction. Entertainment credits 234 provided by person 210 can be authenticated by machine 624. In one embodiment, machine 624 can validate credits using one or more traditional industry accounting systems. Once sufficient credits are received, machine 624 can authorize payment for the transaction and release item 622 to the user 210.

Machine 624 can be communicatively linked to an independent conversion entity 628 via network 626. Based on the amount of credits 234 provided by person 210, negotiable funds 238 can be applied to the food purchase transaction. When person 210 performs payment, credits 234 can be converted into negotiable funds 238 which can be received by vendor 226. In one embodiment, entity 628 can be a communicatively linked service provided by an independent organization. In another embodiment, entity 628 can be a software code executing within machine 624 owned and/or licensed from an independent entity.

In premises 640, an e-commerce kiosk 650 can be located proximate to a casino 642 within premises 646. Person 210 can interact with game of chance machine 222 which can result in earnings in the form of a voucher 648 able to be used at e-commerce kiosk 650. In one embodiment, e-commerce kiosk 650 can be a specialized web terminal for an e-commerce site such as Amazon, only accessible on premises 640, that enables user 210 to engage in what appears from the user end to be an approximately traditional e-commerce transaction (e.g., billing info can be selected as entertainment credits 234 or voucher 648 instead of, or in addition to, credit card information).

Voucher 648 can be generated from a portion of earnings from interaction with game of chance 222. Voucher 648 can be associated with one or more quantities of non-negotiable credits, security information (e.g., bar codes, RFIDs, etc.), and the like. For instance, person 210 can choose to "cash out" ten dollars from a fifty dollar earning in the form of a ten dollar voucher 648. Voucher 648 can be generated automatically via one or more mechanisms. In one embodiment, game of chance 222 can be a machine comprising of a user interactive element able to immediately generate a voucher 648. For instance, a slot machine can include a depressible button for generating vouchers from earnings which can be redeemable at a vendor A. In one instance, voucher 648 can be re-used until the quantity of non-negotiable funds associated with the voucher is exhausted. In another embodiment, voucher 648 can be limited to a specific number of uses. For instance, voucher 648 can be a one-time use voucher which can only be valid for a single purchase.

Voucher 648 can be generated utilizing conversion agency 224. In one instance, voucher 644 can convey voucher information 644 to agency 224. In the instance, voucher information 644 can be stored in data store 656 which can be used to validate voucher 648 at time of purchase. When person 210 presents voucher 648 to vendor 226, voucher 648 can be verified and negotiable funds 238 can be attributed to purchase. For example, person 210 can present voucher 648 to a vendor for the purchase of item 652. In one instance, left over non-negotiable credits not required for purchase of item 652 can be presented to the person 210: say, a person 210 purchasing a ten dollar item 652 using twenty dollar voucher 648 can receive ten dollars in cash from the vendor directly through the e-commerce kiosk 650, or 10 dollars in e-commerce user 210 account credit, specific e-commerce store credit, or the like.

In one instance, machine 222 can present person 210 with a voucher 648 directly corresponding (e.g., one-to-one) to entertainment credits 234 person 210 has earned and/or possesses. In another instance, a casino 624 and/or an e-commerce kiosk 650 determined conversion ratio can be utilized to convert non-negotiable credits associated with a voucher 648 to negotiable funds 238.

In one configuration of the embodiment, voucher 648 can be vendor specific. In the configuration, voucher 648 can be redeemable at only a user specified vendor, which can be accessible via e-commerce kiosk 650, and/or casino determined vendor. In another configuration, voucher 648 can be restricted to use at selected vendors.

In scenario 660, a casino 664 can be proximate to entertainment venue 670 within premises 662. For instance, casino 664, and entertainment venue 670 can be competing entertainment venues (e.g., venue 670 may be another casino or arcade hosting games of chance, as well as an arena providing similar public performances such as concerts or comedy nights) which can be independently owned. Person 210 can interact with game of chance machine 664 which can result in earnings which can be stored on portable artifact 262 associated with person 210. Earnings can be in the form of non-negotiable credits which can be applied to an account associated with portable artifact 262. Person 210 can access entertainment kiosk vendors 226 directly at casino 664 or navigate to venue 670 to access an entertainment kiosk on site and utilize non-negotiable credits associated with artifact 262 to gain admission to an event (e.g., concert 674). For instance, interacting with a game of chance 222 user 210 earns entertainment credits 238. User 210 can access kiosk 226 to convert earnings and purchase off site (i.e. off site of casino 664) event tickets (e.g., the kiosk 226 can allow user 210 to browse and purchase movie tickets at various local theatres, admission to comedy clubs on and off premises, memberships to race kart clubs, golf tournaments, spa services and the like).

In one instance, artifact 262 can be associated with temporal limitations which can affect redemption of non-negotiable credits. In the instance, artifact 262 can be temporary non-negotiable credits which can be valid for a duration of time. For instance, artifact 262 can include non-negotiable credits which are redeemable for admission prior to concert 674.

It should be appreciated that scenarios 610-660 are for illustrative purposes only and should not be construed to limit the invention in any regard. Different embodiments for conducting purchasing at kiosks utilizing non-negotiable credits are contemplated.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A credit to fund conversion system comprising:
   a non-negotiable credit account associated with at least one entity, wherein entertainment credits earned from playing a game are contained within the non-negotiable credit account and are earned though previous interactions between a user and the entity, said entity providing the game;
   a negotiable funds account including negotiable funds that the user is able to apply to user specified purchases, wherein venders involved in the purchases do not honor the entertainment credits for the purchases; and
   a conversion agency configured to automatically and approximately immediately convert a quantity of entertainment credits from the non-negotiable credit account to a quantity of funds in the negotiable funds account responsive to a request from the user, wherein the non-negotiable credit account and the negotiable funds account are maintained using digitally encoded information stored in at least one non-transitory storage medium, wherein the conversion agency converts the quantity of entertainment credits by having at least one processor of computing equipment execute program instructions stored in at least one non-transitory storage medium.

2. The system of claim 1, wherein said user specified purchases are kiosk purchases made using the negotiable funds of the negotiable funds account.

3. The system of claim 2, wherein the game is not played from a kiosk from which the kiosk purchases are made.

4. The system of claim 2, wherein the game is played from a kiosk from which the kiosk purchases are made.

5. The system of claim 2, wherein a kiosk from which the kiosk purchases are made includes automated teller machine (ATM) functionality, which permits users to receive money from their bank accounts via a debit card, and transfer converted credits into a user selected account or to receive money in exchange for the converted credits.

6. The system of claim 1, wherein a kiosk from which the kiosk purchases are made is a point of sale (POS) device, which permits users to pay for the user specified purchases using credit cards or debit cards, wherein the POS device also permits users to pay for the user specified purchases using the converted credits.

7. A computing device comprising:
   at least one processor,
   a non-volatile memory for storing computer program instructions; and
   a network interface card; and
   a bus communicatively linking the at least one processor, the non-volatile memory, and the network interface card, wherein the computing device is operable to execute the computer program instructions causing the computing device to:
   receive a user request to convert a quantity of non-negotiable credits earned by playing a game held in a user account associated with an entity;
   determine a conversion rate between the non-negotiable credits available to the user and a form of negotiable funds;
   subtract a quantity of non-negotiable credits from the user account; and
   transfer a quantity of the non-negotiable funds based upon the determining step to a financial account, wherein the financial account is not associated with the entity, wherein the receiving, determining, subtracting, and transferring steps occur in an approximately immediate fashion.

8. The computing device of claim 7, wherein the computing device is an automated teller machine (ATM).

9. The computing device of claim 8, wherein the computing device provides cash to a user in the amount substantially equal to the quantity of negotiable funds.

10. The computing device of claim 7, wherein the computing device is a point of sale device (POS), which applies at least a portion of the negotiable funds converted from the non-negotiable credits to a purchase.

11. The computing device of claim 7, wherein the computing device is a computer running a browser, wherein the browser is used for an e-commerce purchase to which at least a portion of the quantity of negotiable funds is applied.

12. The computing device of claim 7, wherein the computing device is a kiosk through which goods/services are purchased using at least a portion of the quantity of negotiable funds.

13. The computing device of claim 7, wherein the computing device is a device through which the game is played, through which the quantity of non-negotiable credits was earned.

14. A method for converting and transferring credits to funds comprising:
   identifying entertainment credits from a game of chance associated with an entity with which a user has previously interacted, the previous interactions earning the entertainment credits, which are non-negotiable credits;
   responsive to a user or vendor request, a conversion agency converting a quantity of the entertainment credits to a quantity of negotiable funds or transferring converted entertainment credits to a user or vendor account that is separate from the account where the entertainment credits are held, wherein the conversion agency is not directly associated with the entity; and
   permitting the user to purchase goods/services from a vendor via a kiosk transaction involving a kiosk, where the user expends the entertainment credits during the purchase and wherein the vendor ultimately receives the quantity of negotiable funds provided by the conversion agency for the purchased goods/services, wherein the vendor does not directly honor the non-negotiable credits in absence of conversion actions performed by the conversion agency, wherein the identifying of entertainment credits is performed by computing equipment running software stored in a non-transitory storage medium, wherein the converting is performed by computing equipment running software stored in a non-transitory storage medium, wherein the permitting of access to the quantity of negotiable funds is performed by computing equipment running software stored in a non-transitory storage medium.

15. The method of claim 14, wherein the non-negotiable credits from the game of chance is accrued at a first location where the user previously interacted with the game of chance and at a second location the user performing a purchase utilizing the non-negotiable credits from the vendor which does not honor the non-negotiable credits, wherein the first and second locations comprise of a singular premises associated with the entity and the at least one vendor.

16. The method of claim 14, further comprising:

the conversion agency automatically and approximately immediately adding the quantity of negotiable funds to a user designated account associated with the at least one vendor, wherein the at least one vendor is physically proximate to the entity associated with the game of chance.

17. The method of claim 14, wherein the non-negotiable credits comprise entertainment credits earned from a scratch-off game purchased at a grocery store or gas station, wherein the vendor is the grocery store or gas station, and wherein the goods/services comprise gas or groceries involved in the purchase.

18. The method of claim 14, further comprising:

initiating a kiosk purchase between the user and the vendor, responsive to the initiated kiosk purchase, initiating the converting of the quantity of entertainment credits by the conversion agency; and responsive to the converting and a completion of the kiosk purchase, providing the user with the goods/services in exchange for the quantity of negotiable funds for the purchase.

19. The method of claim 14, wherein the non-negotiable credits are entered into a kiosk during a purchase transaction, wherein the non-negotiable credits are at least one of a casino tokens, casino chips, and casino plaques.

20. The method of claim 14, wherein the game of chance is a government operated game of chance and the converting entity is a non-government entity.

* * * * *